United States Patent
Zhou et al.

(10) Patent No.: US 12,022,446 B2
(45) Date of Patent: *Jun. 25, 2024

(54) BANDWIDTH ALLOCATION METHOD AND APPARATUS, USER EQUIPMENT, AND BASE STATION

(71) Applicant: HUAWEI TECHNOLOGIES CO., LTD., Shenzhen (CN)

(72) Inventors: Yongxing Zhou, Beijing (CN); Jingyuan Sun, Shenzhen (CN); David Jean-Marie Mazzarese, Beijing (CN); Lixia Xue, Beijing (CN); Xiaotao Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,466

(22) Filed: Feb. 3, 2023

(65) Prior Publication Data

US 2023/0328699 A1 Oct. 12, 2023

Related U.S. Application Data

(63) Continuation of application No. 17/373,236, filed on Jul. 12, 2021, now Pat. No. 11,576,175, which is a (Continued)

(51) Int. Cl.
*H04W 72/0446* (2023.01)
*H04B 7/06* (2006.01)
(Continued)

(52) U.S. Cl.
CPC ...... *H04W 72/0446* (2013.01); *H04B 7/0626* (2013.01); *H04L 5/0044* (2013.01);
(Continued)

(58) Field of Classification Search
CPC ... H04L 5/0044; H04L 5/0053; H04L 5/0038; H04L 5/0092; H04L 5/0094;
(Continued)

(56) References Cited

U.S. PATENT DOCUMENTS

| 2002/0147020 A1 | 10/2002 | Iguchi et al. |
| 2007/0129077 A1 | 6/2007 | Iguchi et al. |

(Continued)

FOREIGN PATENT DOCUMENTS

| CN | 101030883 A | 9/2007 |
| CN | 101472300 A | 7/2009 |

(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.8.0, Total 305 pages, 3rd Generation Partnership Project, Valbonne, France (Dec. 2012).

(Continued)

*Primary Examiner* — Basil Ma
(74) *Attorney, Agent, or Firm* — Leydig, Voit & Mayer, Ltd.

(57) ABSTRACT

Embodiments of the present invention provide a bandwidth allocation method and apparatus, user equipment, and a base station. The method includes: receiving, by user equipment, virtual bandwidth configuration information, where the virtual bandwidth configuration information is used for indicating a configuration of a virtual bandwidth; and performing, by the user equipment, signal reception and/or signal processing according to the virtual bandwidth indicated by the virtual bandwidth configuration information, where each virtual bandwidth is a part or all of a downlink maximum available bandwidth or a downlink transmission bandwidth, (Continued)

and the downlink maximum available bandwidth is a maximum bandwidth available for downlink transmission. In the embodiments of the present invention, reduction of overheads and reduction of complexity of signal reception and signal processing are implemented, and overheads and complexity of signal reception and processing feedback can be flexibly controlled.

40 Claims, 6 Drawing Sheets

Related U.S. Application Data continuation of application No. 14/865,831, filed on Sep. 25, 2015, now Pat. No. 11,064,482, which is a continuation of application No. PCT/CN2013/073353, filed on Mar. 28, 2013.

(51) Int. Cl.
    *H04B 17/309*     (2015.01)
    *H04L 5/00*     (2006.01)
    *H04L 41/0803*     (2022.01)
    *H04W 24/06*     (2009.01)
    *H04W 28/20*     (2009.01)
    *H04W 74/00*     (2009.01)

(52) U.S. Cl.
    CPC .......... *H04L 5/0053* (2013.01); *H04L 5/0058* (2013.01); *H04L 5/0092* (2013.01); *H04L 5/0094* (2013.01); *H04L 41/0803* (2013.01); *H04W 24/06* (2013.01); *H04W 28/20* (2013.01); *H04W 74/006* (2013.01); *H04B 17/309* (2015.01); *H04L 5/0051* (2013.01); *H04L 5/0078* (2013.01); *H04L 5/0082* (2013.01)

(58) Field of Classification Search
    CPC .. H04L 41/0803; H04W 28/20; H04W 24/06; H04W 74/006; H04B 7/0626
    See application file for complete search history.

(56) References Cited

U.S. PATENT DOCUMENTS

| | | |
|---|---|---|
| 2009/0303941 A1 | 12/2009 | Naka et al. |
| 2011/0007778 A1 | 1/2011 | Kishiyama et al. |
| 2011/0090809 A1 | 4/2011 | Chen et al. |
| 2011/0110397 A1 | 5/2011 | Mochizuki et al. |
| 2012/0034948 A1 | 2/2012 | Wang et al. |
| 2012/0039283 A1 | 2/2012 | Chen et al. |
| 2012/0243483 A1 | 9/2012 | Ahmadi et al. |
| 2012/0275428 A1 | 11/2012 | Feng et al. |
| 2013/0028134 A1 | 1/2013 | Wang et al. |
| 2013/0107816 A1 | 5/2013 | Iraji et al. |
| 2013/0176952 A1 | 7/2013 | Shin et al. |
| 2014/0105057 A1 | 4/2014 | Liu |
| 2015/0131546 A1 | 5/2015 | Seo et al. |
| 2015/0172017 A1 | 6/2015 | Wu et al. |
| 2015/0319718 A1 | 11/2015 | Yang et al. |
| 2017/0156151 A1 | 6/2017 | Wakabayashi |
| 2018/0041417 A1 | 2/2018 | Liu |

FOREIGN PATENT DOCUMENTS

| | | |
|---|---|---|
| CN | 101473619 A | 7/2009 |
| CN | 101610586 A | 12/2009 |
| CN | 101636936 A | 1/2010 |
| CN | 101651890 A | 2/2010 |
| CN | 101778394 A | 7/2010 |
| CN | 102056246 A | 5/2011 |
| CN | 102130824 A | 7/2011 |
| CN | 102244631 A | 11/2011 |
| CN | 102316595 A | 1/2012 |
| CN | 102546010 A | 7/2012 |
| CN | 102547872 A | 7/2012 |
| CN | 102577559 A | 7/2012 |
| CN | 102668673 A | 9/2012 |
| CN | 102857325 A | 1/2013 |
| CN | 102858014 A | 1/2013 |
| CN | 102891895 A | 1/2013 |
| CN | 102904835 A | 1/2013 |
| CN | 103001754 A | 3/2013 |
| CN | 103733560 A | 4/2014 |
| CN | 103959826 A | 7/2014 |
| CN | 102239737 B | 9/2015 |
| EP | 1569394 A2 | 8/2005 |
| EP | 1906689 A1 | 4/2008 |
| EP | 2317813 A1 | 5/2011 |
| EP | 2320695 A1 | 5/2011 |
| WO | 2008115835 A1 | 9/2008 |
| WO | 2010111974 A1 | 10/2010 |
| WO | 2011082534 A1 | 7/2011 |
| WO | 2012149559 A1 | 11/2012 |
| WO | 2013000411 A1 | 1/2013 |
| WO | 2013016990 A1 | 2/2013 |
| WO | 2013025547 A2 | 2/2013 |

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213 V10.8.0, Total 126 pages, 3rd Generation Partnership Project, Valbonne, France (Dec. 2012).

Mengtian et al., "On Dynamic Bandwidth Virtual Demand Allocation and Its Algorithm," Journal of Shenyang University (Natural Science Edition), Total 2 pages (2004). With an English Abstract.

Caviglione et al., "Peer-to-peer middleware for bandwidth allocation in sensor networks," IEEE Communications Letters, vol. 9, No. 3, Total 3 pages Institute of Electrical and Electronics Engineers, New York, New York (Mar. 2005).

Gardikis et al., "Dynamic bandwidth allocation in DVB-T networks providing IP services," IEEE Transactions on Broadcasting, vol. 49, No. 3, Total 5 pages, Institute of Electrical and Electronics Engineers, New York, New York (Sep. 2003).

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.3.0, pp. 1-344, 3rd Generation Partnership Project, Valbonne, France (Mar. 2013).

"3rd Generation Partnership Project; Technical Specification Group Radio Access Network; Evolved Universal Terrestrial Radio Access (E-UTRA); Physical layer procedures (Release 11)," 3GPP TS 36.213 V11.2.0, pp. 1-173, 3rd Generation Partnership Project, Valbonne, France (Feb. 2013).

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.6.0, pp. 1-101, 3rd Generation Partnership Project, Valbonne, France (Dec. 2012).

"3rd Generation Partnership Project; Technical Specification Group Radio Access Network; Evolved Universal Terrestrial Radio Access (E-UTRA); User Equipment (UE) radio transmission and reception (Release 10)," 3GPP TS 36.101 V10.9.0, pp. 1-361, 3rd Generation Partnership Project, Valbonne, France (Dec. 2012).

"3rd Generation Partnership Project; Technical Specification Group Radio Access Network; Evolved Universal Terrestrial Radio Access (E-UTRA); Multiplexing and channel coding (Release 10)," 3GPP TS 36.212 V10.7.0, pp. 1-79, 3rd Generation Partnership Project, Valbonne, France (Dec. 2012).

"3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321 V10.8.0, pp. 1-54, 3rd Generation Partnership Project, Valbonne, France (Mar. 2013).

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213 V10.1.0, Total 115 pages, 3rd Generation Partnership Project, Valbonne, France (Mar. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.1.0, Total 103 pages, 3rd Generation Partnership Project, Valbonne, France (Mar. 2011).

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.1.0, Total 290 pages (Mar. 2011).

Vangala et al., "A Comparative Study of Polar Code Constructions for the AWGN Channel," Draft Submission, arXiv:1501.02473v1 [cs.IT], Total 9 pages (Jan. 11, 2015).

Blasco-Serrano et al., "Polar Codes for Cooperative Relaying," IEEE Transactions on Communications, vol. 60, No. 11, Institute of Electrical Electronics Engineers, New York, New York, Total 11 pages (Nov. 2012).

Huawei et al., "Polar code design and rate matching," Gothenburg, Sweden, 3GPP TSG RAN WG1 Meeting #86, R1-167209, Total 5 pages, 3rd Generation Partnership Project, Valbonne, France (Aug. 22-26, 2016).

Huawei et al., "Details of the Polar code design," 3GPP TSG RAN WG1 Meeting #87, R1-1611254, Reno, USA, Total 15 pages, 3rd Generation Partnership Project, Valbonne, France (Nov. 10-14, 2016).

Huawei et al., "Summary of polar code design for control channels," 3GPP TSG RAN WG1 Ad-Hoc Meeting, R1-1700088, USA, Total 10 pages, 3rd Generation Partnership Project, Valbonne, France (Jan. 16-20, 2017).

Qualcomm Inc., "Design of Polar codes for control channel," 3GPP TSG-RAN WG1 NR AdHoc, R1-1700832, Spokane, USA, Total 5 pages, 3rd Generation Partnership Project, Valbonne, France (Jan. 16-20, 2017).

Nokia et al., "Polar code design for DL control," 3GPP TSG-RAN WG1#NR Ad-Hoc meeting, R1-1701032, Spokane, U.S.A., Total 3 pages, 3rd Generation Partnership Project, Valbonne, France (Jan. 16-20, 2017).

Huawei et al., "Construction schemes for polar codes," 3GPP TSG RAN WG1 Meeting #88, R1-1701702, Greece, Total 7 pages, 3rd Generation Partnership Project, Valbonne, France (Feb. 13-17, 2017).

NTT Docomo, "Discussion on construction of Polar codes," 3GPP TSG RAN WG1 Meeting #88, R1-1702850, Athens, Greece, Total 9 pages, 3rd Generation Partnership Project, Valbonne, France (Feb. 2017).

Huawei et al., "Theoretical analysis of the sequence generation," Spokane, USA, 3GPP TSG RAN WG1 Meeting #88bis, R1-1705084, Total 8 pages, 3rd Generation Partnership Project, Valbonne, France (Apr. 3-7, 2017).

Samsung, "Repetition for Polar Codes," 3GPP TSG RAN WG1 #88bis, R1-1705423, Spokane, WA, Total 10 pages, 3rd Generation Partnership Project, Valbonne, France (Apr. 3-7, 2017).

Samsung, "Design of a Nested Sequence for Polar Codes," 3GPP TSG RAN WG1 #88bis, R1-1705425, Spokane, WA, Total 8 pages, 3rd Generation Partnership Project, Valbonne, France (Apr. 3-7, 2017).

Qualcomm Inc., "Frank polar construction: nested extension design of polar codes based on mutual information," 3GPP TSG-RAN WG1 #88b, R1-1705633, Spokane, USA, Total 21 pages, 3rd Generation Partnership Project, Valbonne, France (Apr. 3-7, 2017).

NTT Docomo, "Sequence design of Polar codes," 3GPP TSG RAN WG1 Meeting #88bis, R1-1705758, Spokane, USA, Total 5 pages, 3rd Generation Partnership Project, Valbonne, France (Apr. 3-7, 2017).

Qualcomm Incorporated, "Remaining issues on DL reference signals for CoMP," 3GPP TSG-RAN WG1 #70, Qingdao, China, R1-123690, total 3 pages, 3rd Generation Partnership Project, Valbonne, France (Aug. 13-17, 2012).

3GPP TR 36.888 V2.0.0 (Jun. 2012), Technical Report, 3rd Generation Partnership Project; Technical Specification Group Radio Access Network; Study on provision of low-cost MTC UEs based on LTE; (Release 11), Jun. 2012, 43 pages.

3GPP TSG-RAN WG1 #68bis R1-121518 Discussion on bandwidth configuration of CSI-RS.

U.S. Appl. No. 17/373,236, filed Jul. 12, 2021.

U.S. Appl. No. 14/865,831, filed Sep. 25, 2015.

BANDWIDTH ALLOCATION METHOD AND APPARATUS, USER EQUIPMENT, AND BASE STATION

CROSS-REFERENCE TO RELATED APPLICATIONS

This application is a continuation of U.S. patent application Ser. No. 17/373,236, filed on Jul. 12, 2021, which is a continuation of U.S. patent application Ser. No. 14/865,831, filed on Sep. 25, 2015, now U.S. Pat. No. 11,064,482, which is a continuation of International Application No. PCT/CN2013/073353, filed on Mar. 28, 2013. All of the aforementioned patent applications are hereby incorporated by reference in their entireties.

TECHNICAL FIELD

Embodiments of the present invention relate to communications technologies, and in particular, to a bandwidth allocation method and apparatus, user equipment, and a base station.

BACKGROUND

In a Long Term Evolution (LTE for short below) system, each cell has a fixed downlink transmission bandwidth. User equipment (UE for short below) receives broadcast information to obtain a downlink transmission bandwidth, and then performs signal reception and/or signal processing on the basis of the downlink transmission bandwidth.

At present, in an LTE system, UE performs measurement and provides feedback on the basis of one bandwidth, for example, one downlink transmission bandwidth, resulting in problems that overheads and complexity of signal reception and/or processing are not sufficiently flexible and relatively high.

SUMMARY

Embodiments of the present invention provide a bandwidth allocation method and apparatus, user equipment, and a base station, which are used to implement reduction of overheads and complexity of signal reception and/or processing, and can flexibly control overheads and complexity of signal reception and/or processing feedback.

According to a first aspect, an embodiment of the present invention provides a bandwidth configuration method, including:
  receiving, by user equipment UE, at least one piece of virtual bandwidth configuration information, where the virtual bandwidth configuration information is used for indicating a configuration of a virtual bandwidth; and
  performing, by the UE, signal reception and/or signal processing according to at least one virtual bandwidth in the virtual bandwidth indicated by the at least one piece of virtual bandwidth configuration information, where
  each virtual bandwidth is a part or all of a downlink maximum available bandwidth or a downlink transmission bandwidth, and the downlink maximum available bandwidth is a maximum bandwidth available for downlink transmission.

With reference to the first aspect, in a first possible implementation manner of the first aspect, the performing, by the UE, signal reception and/or signal processing according to at least one virtual bandwidth in the virtual bandwidth indicated by the at least one piece of virtual bandwidth configuration information includes:
  performing, by the UE, signal reception or signal processing on each virtual bandwidth in all virtual bandwidths corresponding to the at least one piece of virtual bandwidth configuration information.

With reference to the first aspect, in a second possible implementation manner of the first aspect, the UE receives at least two pieces of virtual bandwidth configuration information, and the method further includes:
  receiving, by the UE, first configuration information, where the first configuration information is used for instructing the UE to perform signal reception or signal processing according to a virtual bandwidth corresponding to at least one piece of virtual bandwidth configuration information in the at least two pieces of virtual bandwidth configuration information.

With reference to the first or second possible implementation manner of the first aspect, in a third possible implementation manner of the first aspect, the method further includes:
  receiving, by the UE, second configuration information that is used for performing signal reception and/or signal processing on the virtual bandwidth, where the second configuration information is configuration information of the signal or signal processing.

With reference to the first aspect, in a fourth possible implementation manner of the first aspect, the virtual bandwidth configuration information is used for instructing the UE to perform at least one type of signal reception or signal processing on each virtual bandwidth in the virtual bandwidth corresponding to the at least one piece of virtual bandwidth configuration information.

With reference to the first aspect, or any one of the first to fourth possible implementation manners of the first aspect, in a fifth possible implementation manner of the first aspect, the signal reception and/or signal processing includes at least one of the following signal reception or signal processing:
  channel state information reference signal CSI-RS reception, cell-specific reference signal CRS reception, physical downlink control channel PDCCH search, enhanced physical downlink control channel EPDCCH search, channel state information CSI measurement, radio resource management RRM measurement, CSI feedback, physical downlink shared channel PDSCH reception, physical hybrid automatic repeat request indicator channel PHICH reception, enhanced physical hybrid automatic repeat request indicator channel EPHICH reception, physical multicast channel PMCH reception, and common signal reception, where
  the common signal reception includes at least one of the following:
  physical broadcast channel PBCH reception, enhanced physical broadcast channel ePBCH reception, primary synchronization signal PSS/secondary synchronization signal SSS reception, and discovery signal reception.

With reference to the first aspect, in a sixth possible implementation manner of the first aspect, the virtual bandwidth configuration information includes at least one piece of information of a size, position information, a type, and downlink transmit power information of the virtual bandwidth.

With reference to the sixth possible implementation manner of the first aspect, in a seventh possible implementation manner of the first aspect, the position information of the virtual bandwidth includes starting position information of the virtual bandwidth or central frequency information of the virtual bandwidth, where a starting position of the virtual bandwidth is a starting position of any one resource block group in resource block groups obtained by dividing according to the downlink maximum available bandwidth or the downlink transmission bandwidth.

With reference to the sixth possible implementation manner of the first aspect, in an eighth possible implementation manner of the first aspect, the size of the virtual bandwidth equals a sum of sizes of at least one resource block group in resource block groups obtained by dividing according to the downlink maximum available bandwidth or the downlink transmission bandwidth; or the size of the virtual bandwidth is predefined.

With reference to the sixth possible implementation manner of the first aspect, in a ninth possible implementation manner of the first aspect, the downlink transmit power information includes transmit power of a cell-specific reference signal CRS or a reduced cell-specific reference signal RCRS.

With reference to the sixth possible implementation manner of the first aspect, in a tenth possible implementation manner of the first aspect, the type of the virtual bandwidth is at least one of a centralized virtual bandwidth, a discontinuous virtual bandwidth, and a distributed virtual bandwidth.

With reference to the sixth possible implementation manner of the first aspect, in an eleventh possible implementation manner of the first aspect, when the UE receives at least two pieces of virtual bandwidth configuration information, at least one of position information, sizes, types, and downlink transmit power information corresponding to virtual bandwidths indicated by any two pieces of virtual bandwidth configuration information in the at least two pieces of virtual bandwidth configuration information is different.

With reference to the first aspect, in a twelfth possible implementation manner of the first aspect, the receiving, by UE, at least one piece of virtual bandwidth configuration information includes:
    receiving, by the UE, the at least one piece of virtual bandwidth configuration information carried in broadcast message signaling or multicast signaling or UE specific signaling.

With reference to the first aspect, in a thirteenth possible implementation manner of the first aspect, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a common control channel.

With reference to the first aspect, or any one of the first to thirteenth possible implementation manners of the first aspect, in a fourteenth possible implementation manner of the first aspect, the at least one piece of virtual bandwidth configuration information is virtual bandwidth configuration information corresponding to each CSI-RS in at least one CSI-RS, and performing, by the UE, signal reception according to at least one virtual bandwidth in the virtual bandwidth indicated by the at least one piece of virtual bandwidth configuration information includes:
    receiving, by the UE, a corresponding CSI-RS according to the configured virtual bandwidth, where the CSI-RS is a non zero power channel state information reference signal NZP CSI-RS or a zero power channel state information reference signal ZP CSI-RS.

With reference to the fourteenth possible implementation manner of the first aspect, in a fifteenth possible implementation manner of the first aspect, when the CSI-RS is an NZP CSI-RS, a sequence of the NZP CSI-RS is generated based on a preset formula and according to a virtual bandwidth corresponding to the NZP CSI-RS; or
    a sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula; or
    a sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

With reference to the fourteenth possible implementation manner of the first aspect, in a sixteenth possible implementation manner of the first aspect, performing, by the UE, signal processing according to the virtual bandwidth indicated by the virtual bandwidth configuration information includes:
    performing, by the UE, RRM measurement according to a virtual bandwidth of the CSI-RS.

With reference to the fourteenth possible implementation manner of the first aspect, in a seventeenth possible implementation manner of the first aspect, the method further includes:
    when the CSI-RS is an NZP CSI-RS, receiving, by the UE, transmit power information corresponding to the NZP CSI-RS on a virtual bandwidth corresponding to the virtual bandwidth configuration information.

With reference to the first aspect, or any one of the first to thirteenth possible implementation manners of the first aspect, in an eighteenth possible implementation manner of the first aspect, the receiving, by UE, at least one piece of virtual bandwidth configuration information includes:
    receiving, by the UE, virtual bandwidth configuration information corresponding to each CSI-IM in at least one channel state information interference measurement CSI-IM.

With reference to the first aspect, or any one of the first to thirteenth possible implementation manners of the first aspect, in a nineteenth possible implementation manner of the first aspect, the at least one piece of virtual bandwidth configuration information is virtual bandwidth configuration information corresponding to each CSI process in at least one channel state information process CSI process, and performing, by the UE, signal processing according to at least one virtual bandwidth in the virtual bandwidth indicated by the at least one piece of virtual bandwidth configuration information includes:
    performing, by the UE, measurement or measurement feedback of the CSI according to the virtual bandwidth configuration information corresponding to each CSI process.

With reference to the nineteenth possible implementation manner of the first aspect, in a twentieth possible implementation manner of the first aspect, the starting position of the virtual bandwidth is a starting position of any one subband in subbands obtained by dividing according to the downlink maximum available bandwidth or the downlink transmission bandwidth; and/or the size of the virtual bandwidth equals a sum of sizes of at least one subband in the subbands obtained by dividing according to the downlink maximum available bandwidth or the downlink transmission bandwidth.

With reference to the nineteenth possible implementation manner of the first aspect, in a twenty-first possible implementation manner of the first aspect, a virtual bandwidth corresponding to the CSI process is covered within a range of a virtual bandwidth of an NZP CSI-RS and/or a CSI-IM corresponding to the CSI process; or the virtual bandwidth configuration information corresponding to the CSI process is virtual bandwidth configuration information of an NZP CSI-RS and/or a CSI-IM corresponding to the CSI process.

With reference to the first aspect, or any one of the first to thirteenth and nineteenth possible implementation manners of the first aspect, in a twenty-second possible implementation manner of the first aspect, the virtual bandwidth configuration information is used for indicating a corresponding virtual bandwidth used for performing resource allocation for the UE, where there is at least one corresponding virtual bandwidth used for performing resource allocation for the UE.

With reference to the twenty-second possible implementation manner of the first aspect, in a twenty-third possible implementation manner of the first aspect, the corresponding virtual bandwidth used for performing resource allocation for the UE and a virtual bandwidth corresponding to the CSI process are independently configured.

With reference to the twenty-second possible implementation manner of the first aspect, in a twenty-fourth possible implementation manner of the first aspect, a resource included to perform resource allocation once for the UE is a resource on at least one virtual bandwidth.

With reference to the twenty-second possible implementation manner of the first aspect, in a twenty-fifth possible implementation manner of the first aspect, after the receiving, by UE, at least one piece of virtual bandwidth configuration information, the method further includes:

receiving, by the UE, resource allocation information, where the resource allocation information includes index information of at least one virtual bandwidth corresponding to a resource allocated to the UE.

With reference to the twenty-second possible implementation manner of the first aspect, in a twenty-sixth possible implementation manner of the first aspect, after the receiving, by UE, at least one piece of virtual bandwidth configuration information, the method further includes:

receiving, by the UE, resource allocation information, where a length of the resource allocation information is determined by a size of the virtual bandwidth.

With reference to the first aspect, in a twenty-seventh possible implementation manner of the first aspect, when the UE receives at least two pieces of virtual bandwidth configuration information, the method further includes:

receiving, by the UE, scheduling information of inter-virtual bandwidth, where the scheduling information includes index information for indicating a virtual bandwidth corresponding to a resource scheduled by using the scheduling information.

With reference to the twenty-second possible implementation manner of the first aspect, in a twenty-eighth possible implementation manner of the first aspect, a size of a resource block group in the virtual bandwidth is determined according to the virtual bandwidth or the downlink maximum available bandwidth or the downlink transmission bandwidth.

With reference to the first aspect, or any one of the first to thirteenth possible implementation manners of the first aspect, in a twenty-ninth possible implementation manner of the first aspect, the method further includes:

receiving, by the UE, third configuration information of rate matching and quasi co-location assumption corresponding to the virtual bandwidth.

With reference to the first aspect, or any one of the first to thirteenth possible implementation manners of the first aspect, in a thirtieth possible implementation manner of the first aspect, the method further includes:

receiving, by the UE, fourth configuration information of quasi co-location assumption corresponding to the virtual bandwidth, where the fourth configuration information includes at least one of the following information: a quantity of ports of a CRS, position information of a subframe of a CRS, position information of a first symbol of a PDSCH, multicast/broadcast single frequency network MBSFN configuration information in the virtual bandwidth, and ZP CSI-RS configuration information in the virtual bandwidth.

With reference to the first aspect, or any one of the first to thirteenth possible implementation manners of the first aspect, in a thirty-first possible implementation manner of the first aspect, the method further includes:

receiving, by the UE, fifth configuration information of quasi co-location assumption corresponding to the virtual bandwidth, where the fifth configuration information includes at least one of the following information: configuration information of a CSI-RS that is quasi co-located with a demodulation reference signal DM RS and configuration information of a CRS that is quasi co-located with a CSI-RS.

With reference to any one of the twenty-ninth to thirty-first possible implementation manners of the first aspect, in a thirty-second possible implementation manner of the first aspect, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

With reference to the first aspect, or any one of the first to thirteenth possible implementation manners of the first aspect, in a thirty-third possible implementation manner of the first aspect, the method further includes:

receiving, by the UE, sixth configuration information, where the sixth configuration information is used for indicating a transmission resource of a physical uplink control channel PUCCH acknowledgement signal/negative-acknowledgement signal ACK/NACK corresponding to the virtual bandwidth.

According to a second aspect, an embodiment of the present invention provides a bandwidth configuration method, including:

determining, by a base station, at least one virtual bandwidth that is used by user equipment UE to perform signal reception and/or signal processing; and sending, by the base station, at least one piece of virtual bandwidth configuration information to the UE, so as to instruct the UE to perform signal reception and/or signal processing according to at least one virtual bandwidth in the virtual bandwidth indicated by the at least one piece of virtual bandwidth configuration information, where each virtual bandwidth is a part or all of a downlink maximum available bandwidth or a downlink transmission bandwidth, and the downlink maximum available bandwidth is a maximum bandwidth available for downlink transmission.

With reference to the second aspect, in a first possible implementation manner of the second aspect, the base station sends at least two pieces of virtual bandwidth configuration information to the UE, and the method further includes:

sending, by the base station, first configuration information to the UE, where the first configuration information is used for instructing the UE to perform signal reception or signal processing according to a virtual bandwidth corresponding to at least one piece of virtual bandwidth configuration information in the at least two pieces of virtual bandwidth configuration information.

With reference to the second aspect or the first possible implementation manner of the second aspect, in a second possible implementation manner of the second aspect, the method further includes:

sending, by the base station to the UE, second configuration information that is used for performing signal reception and/or signal processing on the virtual bandwidth, where the second configuration information is configuration information of the signal or signal processing.

With reference to the second aspect, in a third possible implementation manner of the second aspect, the virtual bandwidth configuration information is used for instructing the UE to perform at least one type of signal reception or signal processing on each virtual bandwidth in the virtual bandwidth corresponding to the at least one piece of virtual bandwidth configuration information.

With reference to the second aspect, or any one of the first to third possible implementation manners of the second aspect, in a fourth possible implementation manner of the second aspect, the signal reception and/or signal processing includes at least one of the following signal reception or signal processing:

channel state information reference signal CSI-RS reception, cell-specific reference signal CRS reception, physical downlink control channel PDCCH search, enhanced physical downlink control channel EPDCCH search, channel state information CSI measurement, radio resource management RRM measurement, CSI feedback, physical downlink shared channel PDSCH reception, physical hybrid automatic repeat request indicator channel PHICH reception, enhanced physical hybrid automatic repeat request indicator channel EPHICH reception, physical multicast channel PMCH reception, and common signal reception, where the common signal reception includes at least one of the following:

physical broadcast channel PBCH reception, enhanced physical broadcast channel ePBCH reception, primary synchronization signal PSS/secondary synchronization signal SSS reception, and discovery signal reception.

With reference to the second aspect, in a fifth possible implementation manner of the second aspect, the virtual bandwidth configuration information includes at least one piece of information of a size, position information, a type, and downlink transmit power information of the virtual bandwidth.

With reference to the fifth possible implementation manner of the second aspect, in a sixth possible implementation manner of the second aspect, the position information of the virtual bandwidth includes starting position information of the virtual bandwidth or central frequency information of the virtual bandwidth, where a starting position of the virtual bandwidth is a starting position of any one resource block group in resource block groups obtained by dividing according to the downlink maximum available bandwidth or the downlink transmission bandwidth.

With reference to the fifth possible implementation manner of the second aspect, in a seventh possible implementation manner of the second aspect, the size of the virtual bandwidth equals a sum of sizes of at least one resource block group in resource block groups obtained by dividing according to the downlink maximum available bandwidth or the downlink transmission bandwidth; or the size of the virtual bandwidth is predefined.

With reference to the fifth possible implementation manner of the second aspect, in an eighth possible implementation manner of the second aspect, the downlink transmit power information includes transmit power of a cell-specific reference signal CRS or a reduced cell-specific reference signal RCRS.

With reference to the fifth possible implementation manner of the second aspect, in a ninth possible implementation manner of the second aspect, the type of the virtual bandwidth is at least one of a centralized virtual bandwidth, a discontinuous virtual bandwidth, and a distributed virtual bandwidth.

With reference to the fifth possible implementation manner of the second aspect, in a tenth possible implementation manner of the second aspect, when the base station sends two or more pieces of virtual bandwidth configuration information to the UE, at least one of position information, sizes, types, and downlink transmit power information corresponding to virtual bandwidths indicated by any two pieces of virtual bandwidth configuration information in the two or more pieces of virtual bandwidth configuration information is different.

With reference to the second aspect, in an eleventh possible implementation manner of the second aspect, the sending, by the base station, at least one piece of virtual bandwidth configuration information to the UE includes:

sending, by the base station to the UE, the at least one piece of virtual bandwidth configuration information carried in broadcast message signaling or multicast signaling or UE specific signaling.

With reference to the second aspect, in a twelfth possible implementation manner of the second aspect, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a physical common control channel.

With reference to the second aspect, or any one of the first to twelfth possible implementation manners of the second aspect, in a thirteenth possible implementation manner of the second aspect, the sending, by the base station, at least one piece of virtual bandwidth configuration information to the UE includes:

sending, by the base station to the UE, virtual bandwidth configuration information corresponding to each CSI-RS in at least one CSI-RS, so that the UE receives a corresponding CSI-RS according to at least one virtual bandwidth in the virtual bandwidth indicated by the at least one piece of virtual bandwidth configuration information, where the CSI-RS is a non zero power channel state information reference signal NZP CSI-RS or a zero power channel state information reference signal ZP CSI-RS.

With reference to the thirteenth possible implementation manner of the second aspect, in a fourteenth possible implementation manner of the second aspect, when the CSI-RS is an NZP CSI-RS, a sequence of the NZP CSI-RS is generated based on a preset formula and according to a virtual bandwidth corresponding to the NZP CSI-RS; or
a sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula; or
a sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

With reference to the thirteenth possible implementation manner of the second aspect, in a fifteenth possible implementation manner of the second aspect, the method further includes:
when the CSI-RS is an NZP CSI-RS, sending, by the base station to the UE, transmit power information corresponding to the NZP CSI-RS on a virtual bandwidth corresponding to the virtual bandwidth configuration information.

With reference to the second aspect, or any one of the first to twelfth possible implementation manners of the second aspect, in a sixteenth possible implementation manner of the second aspect, the sending, by the base station, at least one piece of virtual bandwidth configuration information to the UE includes:
sending, by the base station to the UE, virtual bandwidth configuration information corresponding to each CSI-IM in at least one channel state information interference measurement CSI-IM.

With reference to the second aspect, or any one of the first to twelfth possible implementation manners of the second aspect, in a seventeenth possible implementation manner of the second aspect, the sending, by the base station, at least one piece of virtual bandwidth configuration information to the UE includes:
sending, by the base station to the UE, virtual bandwidth configuration information corresponding to each CSI process in at least one channel state information process CSI process, so that the UE performs measurement or measurement feedback of the CSI according to the virtual bandwidth configuration information corresponding to each CSI process.

With reference to the seventeenth possible implementation manner of the second aspect, in an eighteenth possible implementation manner of the second aspect, the starting position of the virtual bandwidth is a starting position of any one subband in subbands obtained by dividing according to the downlink maximum available bandwidth or the downlink transmission bandwidth; and/or
the size of the virtual bandwidth equals a sum of sizes of at least one subband in the subbands obtained by dividing according to the downlink maximum available bandwidth or the downlink transmission bandwidth.

With reference to the seventeenth possible implementation manner of the second aspect, in a nineteenth possible implementation manner of the second aspect, a virtual bandwidth corresponding to the CSI process is covered within a range of a virtual bandwidth of an NZP CSI-RS and/or a CSI-IM corresponding to the CSI process; or
the virtual bandwidth configuration information corresponding to the CSI process is virtual bandwidth configuration information of an NZP CSI-RS and/or a CSI-IM corresponding to the CSI process.

With reference to the second aspect, or any one of the first to twelfth and seventeenth possible implementation manners of the second aspect, in a twentieth possible implementation manner of the second aspect, the virtual bandwidth configuration information is used for indicating a corresponding virtual bandwidth used for performing resource allocation for the UE, where there is at least one corresponding virtual bandwidth used for performing resource allocation for the UE.

With reference to the twentieth possible implementation manner of the second aspect, in a twenty-first possible implementation manner of the second aspect, the corresponding virtual bandwidth used for performing resource allocation for the UE and a virtual bandwidth corresponding to the CSI process are independently configured.

With reference to the twentieth possible implementation manner of the second aspect, in a twenty-second possible implementation manner of the second aspect, a resource included to perform resource allocation once for the UE is a resource on at least one virtual bandwidth.

With reference to the twentieth possible implementation manner of the second aspect, in a twenty-third possible implementation manner of the second aspect, after the sending, by the base station, the virtual bandwidth configuration information to the UE, the method further includes:
sending, by the base station, resource allocation information to the UE, where the resource allocation information includes index information of at least one virtual bandwidth corresponding to the resource.

With reference to the twentieth possible implementation manner of the second aspect, in a twenty-fourth possible implementation manner of the second aspect, after the sending, by the base station, the virtual bandwidth configuration information to the UE, the method further includes:
sending, by the base station, resource allocation information to the UE, where a length of the resource allocation information is determined by a size of the virtual bandwidth.

With reference to the second aspect, in a twenty-fifth possible implementation manner of the second aspect, when the base station sends at least two pieces of virtual bandwidth configuration information to the UE, the method further includes:
sending, by the base station, scheduling information of inter-virtual bandwidth to the UE, where the scheduling information includes index information that is used for indicating a virtual bandwidth corresponding to the scheduling information and that is sent by the base station to the UE.

With reference to the twentieth possible implementation manner of the second aspect, in a twenty-sixth possible implementation manner of the second aspect, a size of a resource block group in the virtual bandwidth is determined according to the virtual bandwidth or the downlink maximum available bandwidth or the downlink transmission bandwidth.

With reference to the second aspect, or any one of the first to twelfth possible implementation manners of the second aspect, in a twenty-seventh possible implementation manner of the second aspect, the method further includes:

sending, by the base station to the UE, third configuration information of rate matching and quasi co-location assumption corresponding to the virtual bandwidth.

With reference to the second aspect, or any one of the first to twelfth possible implementation manners of the second aspect, in a twenty-eighth possible implementation manner of the second aspect, the method further includes:

sending, by the base station to the UE, fourth configuration information of quasi co-location assumption corresponding to the virtual bandwidth, where the fourth configuration information includes at least one of the following information: a quantity of ports of a CRS, position information of a subframe of a CRS, position information of a first symbol of a PDSCH, multicast/broadcast single frequency network MBSFN configuration information in the virtual bandwidth, and ZP CSI-RS configuration information in the virtual bandwidth.

With reference to the second aspect, or any one of the first to twelfth possible implementation manners of the second aspect, in a twenty-ninth possible implementation manner of the second aspect, the method further includes:

sending, by the base station to the UE, fifth configuration information of quasi co-location assumption corresponding to the virtual bandwidth, where the fifth configuration information includes at least one of the following information: configuration information of a CSI-RS that is quasi co-located with a demodulation reference signal DM RS and configuration information of a CRS that is quasi co-located with a CSI-RS.

With reference to any one of the twenty-seventh to twenty-ninth possible implementation manners of the second aspect, in a thirtieth possible implementation manner of the second aspect, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

With reference to the second aspect, or any one of the first to twelfth possible implementation manners of the second aspect, in a thirty-first possible implementation manner of the second aspect, the method further includes:

sending, by the base station to the UE, sixth configuration information, where the sixth configuration information is used for indicating a transmission resource of a physical uplink control channel PUCCH acknowledgement signal/negative-acknowledgement signal ACK/NACK corresponding to the virtual bandwidth.

According to a third aspect, an embodiment of the present invention provides a bandwidth configuration apparatus, including:

a receiving module, configured to receive at least one piece of virtual bandwidth configuration information, where the virtual bandwidth configuration information is used for indicating a configuration of a virtual bandwidth; and a processing module, configured to perform signal reception and/or signal processing according to at least one virtual bandwidth in the virtual bandwidth indicated by the at least one piece of virtual bandwidth configuration information, where each virtual bandwidth is a part or all of a downlink maximum available bandwidth or a downlink transmission bandwidth, and the downlink maximum available bandwidth is a maximum bandwidth available for downlink transmission.

With reference to the third aspect, in a first possible implementation manner of the third aspect, the processing module is specifically configured to perform signal reception or signal processing on each virtual bandwidth in all virtual bandwidths corresponding to the at least one piece of virtual bandwidth configuration information.

With reference to the third aspect, in a second possible implementation manner of the third aspect, the receiving module is specifically configured to receive at least two pieces of virtual bandwidth configuration information, and the receiving module is further configured to receive first configuration information, where the first configuration information is used for instructing the processing module to perform signal reception or signal processing according to a virtual bandwidth corresponding to at least one piece of virtual bandwidth configuration information in the at least two pieces of virtual bandwidth configuration information.

With reference the first or second possible implementation manner of the third aspect, in a third possible implementation manner of the third aspect, the receiving module is further configured to receive second configuration information that is used for performing signal reception and/or signal processing on the virtual bandwidth, where the second configuration information is configuration information of the signal or signal processing.

With reference to the third aspect, in a fourth possible implementation manner of the third aspect, the virtual bandwidth configuration information is used for instructing the processing module to perform at least one type of signal reception or signal processing on each virtual bandwidth in the virtual bandwidth corresponding to the at least one piece of virtual bandwidth configuration information.

With reference to the third aspect, or any one of the first to fourth possible implementation manners of the third aspect, in a fifth possible implementation manner of the third aspect, the signal reception and/or signal processing includes at least one of the following signal reception or signal processing:

channel state information reference signal CSI-RS reception, cell-specific reference signal CRS reception, physical downlink control channel PDCCH search, enhanced physical downlink control channel EPDCCH search, channel state information CSI measurement, radio resource management RRM measurement, CSI feedback, physical downlink shared channel PDSCH reception, physical hybrid automatic repeat request indicator channel PHICH reception, enhanced physical hybrid automatic repeat request indicator channel EPHICH reception, physical multicast channel PMCH reception, and common signal reception, where the common signal reception includes at least one of the following:

physical broadcast channel PBCH reception, enhanced physical broadcast channel ePBCH reception, primary synchronization signal PSS/secondary synchronization signal SSS reception, and discovery signal reception.

With reference to the third aspect, in a sixth possible implementation manner of the third aspect, the virtual bandwidth configuration information includes at least one piece of information of a size, position information, a type, and downlink transmit power information of the virtual bandwidth.

With reference to the sixth possible implementation manner of the third aspect, in a seventh possible implementation manner of the third aspect, the position information of the virtual bandwidth includes starting position information of the virtual bandwidth or central frequency information of the virtual bandwidth, where a starting position of the virtual bandwidth is a starting position of any one resource block group in resource block groups obtained by dividing according to the downlink maximum available bandwidth or the downlink transmission bandwidth.

With reference to the sixth possible implementation manner of the third aspect, in an eighth possible implementation manner of the third aspect, the size of the virtual bandwidth equals a sum of sizes of at least one resource block group in resource block groups obtained by dividing according to the downlink maximum available bandwidth or the downlink transmission bandwidth; or the size of the virtual bandwidth is predefined.

With reference to the sixth possible implementation manner of the third aspect, in a ninth possible implementation manner of the third aspect, the downlink transmit power information includes transmit power of a CRS or a reduced cell-specific reference signal RCRS.

With reference to the sixth possible implementation manner of the third aspect, in a tenth possible implementation manner of the third aspect, the type of the virtual bandwidth is at least one of a centralized virtual bandwidth, a discontinuous virtual bandwidth, and a distributed virtual bandwidth.

With reference to the sixth possible implementation manner of the third aspect, in an eleventh possible implementation manner of the third aspect, when the receiving module is specifically configured to receive at least two pieces of virtual bandwidth configuration information, at least one of position information, sizes, types, and downlink transmit power information corresponding to virtual bandwidths indicated by any two pieces of virtual bandwidth configuration information in the at least two pieces of virtual bandwidth configuration information is different.

With reference to the third aspect, in a twelfth possible implementation manner of the third aspect, the receiving module is specifically configured to receive the at least one piece of virtual bandwidth configuration information carried in broadcast message signaling or multicast signaling or user equipment UE specific signaling.

With reference to the third aspect, in a thirteenth possible implementation manner of the third aspect, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a common control channel.

With reference to the third aspect, or any one of the first to thirteenth possible implementation manners of the third aspect, in a fourteenth possible implementation manner of the third aspect, the at least one piece of virtual bandwidth configuration information is virtual bandwidth configuration information corresponding to each CSI-RS in at least one CSI-RS, and the processing module is specifically configured to receive a corresponding CSI-RS according to the configured virtual bandwidth, where the CSI-RS is a non zero power channel state information reference signal NZP CSI-RS or a zero power channel state information reference signal ZP CSI-RS.

With reference to the fourteenth possible implementation manner of the third aspect, in a fifteenth possible implementation manner of the third aspect, when the CSI-RS is an NZP CSI-RS, a sequence of the NZP CSI-RS is generated based on a preset formula and according to a virtual bandwidth corresponding to the NZP CSI-RS; or
  a sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula; or
  a sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

With reference to the fourteenth possible implementation manner of the third aspect, in a sixteenth possible implementation manner of the third aspect, the processing module is specifically configured to perform RRM measurement according to a virtual bandwidth of the CSI-RS.

With reference to the fourteenth possible implementation manner of the third aspect, in a seventeenth possible implementation manner of the third aspect, when the CSI-RS is an NZP CSI-RS, the processing module is further configured to receive transmit power information corresponding to the NZP CSI-RS on a virtual bandwidth corresponding to the virtual bandwidth configuration information.

With reference to the third aspect, or any one of the first to thirteenth possible implementation manners of the third aspect, in an eighteenth possible implementation manner of the third aspect, the receiving module is specifically configured to:
  receive virtual bandwidth configuration information corresponding to each CSI-IM in at least one channel state information interference measurement CSI-IM.

With reference to the third aspect, or any one of the first to thirteenth possible implementation manners of the third aspect, in a nineteenth possible implementation manner of the third aspect, the at least one piece of virtual bandwidth configuration information is virtual bandwidth configuration information corresponding to each CSI process in at least one channel state information process CSI process, and the processing module is specifically configured to:
  perform measurement or measurement feedback of the CSI according to the virtual bandwidth configuration information corresponding to each CSI process.

With reference to the nineteenth possible implementation manner of the third aspect, in a twentieth possible implementation manner of the third aspect, the starting position of the virtual bandwidth is a starting position of any one subband in subbands obtained by dividing according to the downlink maximum available bandwidth or the downlink transmission bandwidth; and/or the size of the virtual bandwidth equals a sum of sizes of at least one subband in the subbands obtained by dividing according to the downlink maximum available bandwidth or the downlink transmission bandwidth.

With reference to the nineteenth possible implementation manner of the third aspect, in a twenty-first possible implementation manner of the third aspect, a virtual bandwidth corresponding to the CSI process is covered within a range of a virtual bandwidth of an NZP CSI-RS and/or a CSI-IM corresponding to the CSI process; or
  the virtual bandwidth configuration information corresponding to the CSI process is virtual bandwidth configuration information of an NZP CSI-RS and/or a CSI-IM corresponding to the CSI process.

With reference to the third aspect, or any one of the first to thirteenth and nineteenth possible implementation manners of the third aspect, in a twenty-second possible implementation manner of the third aspect, the virtual bandwidth configuration information is used for indicating a corresponding virtual bandwidth used for performing resource allocation for the UE, where there is at least one corresponding virtual bandwidth used for performing resource allocation for the UE.

With reference to the twenty-second possible implementation manner of the third aspect, in a twenty-third possible implementation manner of the third aspect, the corresponding virtual bandwidth used for performing resource allocation for the UE and a virtual bandwidth corresponding to the CSI process are independently configured.

With reference to the twenty-second possible implementation manner of the third aspect, in a twenty-fourth possible implementation manner of the third aspect, a resource included to perform resource allocation once for the UE is a resource on at least one virtual bandwidth.

With reference to the twenty-second possible implementation manner of the third aspect, in a twenty-fifth possible implementation manner of the third aspect, the receiving module is further configured to receive resource allocation information, where the resource allocation information includes index information of at least one virtual bandwidth corresponding to a resource allocated to the UE.

With reference to the twenty-second possible implementation manner of the third aspect, in a twenty-sixth possible implementation manner of the third aspect, the receiving module is further configured to receive resource allocation information, where a length of the resource allocation information is determined by a size of the virtual bandwidth.

With reference to the third aspect, in a twenty-seventh possible implementation manner of the third aspect, when the receiving module receives at least two pieces of virtual bandwidth configuration information, the receiving module is further configured to receive scheduling information of inter-virtual bandwidth, where the scheduling information includes index information for indicating a virtual bandwidth corresponding to a resource scheduled by using the scheduling information.

With reference to the twenty-second possible implementation manner of the third aspect, in a twenty-eighth possible implementation manner of the third aspect, a size of a resource block group in the virtual bandwidth is determined according to the virtual bandwidth or the downlink maximum available bandwidth or the downlink transmission bandwidth.

With reference to the third aspect, or any one of the first to thirteenth possible implementation manners of the third aspect, in a twenty-ninth possible implementation manner of the third aspect, the receiving module is further configured to receive third configuration information of rate matching and quasi co-location assumption corresponding to the virtual bandwidth.

With reference to the third aspect, or any one of the first to thirteenth possible implementation manners of the third aspect, in a thirtieth possible implementation manner of the third aspect, the receiving module is further configured to receive fourth configuration information of quasi co-location assumption corresponding to the virtual bandwidth, where the fourth configuration information includes at least one of the following information: a quantity of ports of a CRS, position information of a subframe of a CRS, position information of a first symbol of a PDSCH, multicast/broadcast single frequency network MBSFN configuration information in the virtual bandwidth, and ZP CSI-RS configuration information in the virtual bandwidth.

With reference to the third aspect, or any one of the first to thirteenth possible implementation manners of the third aspect, in a thirty-first possible implementation manner of the third aspect, the receiving module is further configured to receive fifth configuration information of quasi co-location assumption corresponding to the virtual bandwidth, where the fifth configuration information includes at least one of the following information: configuration information of a CSI-RS that is quasi co-located with a demodulation reference signal DM RS and configuration information of a CRS that is quasi co-located with a CSI-RS.

With reference to any one of the twenty-ninth to thirty-first possible implementation manners of the third aspect, in a thirty-second possible implementation manner of the third aspect, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

With reference to the third aspect, or any one of the first to thirteenth possible implementation manners of the third aspect, in a thirty-third possible implementation manner of the third aspect, the receiving module is further configured to receive sixth configuration information, where the sixth configuration information is used for indicating a transmission resource of a physical uplink control channel PUCCH acknowledgement signal/negative-acknowledgement signal ACK/NACK corresponding to the virtual bandwidth.

According to a fourth aspect, an embodiment of the present invention provides a bandwidth configuration apparatus, including:
  a determining module, configured to determine at least one virtual bandwidth that is used by user equipment UE to perform signal reception and/or signal processing; and
  a sending module, configured to send at least one piece of virtual bandwidth configuration information to the UE, so as to instruct the UE to perform signal reception and/or signal processing according to at least one virtual bandwidth in the virtual bandwidth indicated by the at least one piece of virtual bandwidth configuration information, where each virtual bandwidth is a part or all of a downlink maximum available bandwidth or a downlink transmission bandwidth, and the downlink maximum available bandwidth is a maximum bandwidth available for downlink transmission.

With reference to the fourth aspect, in a first possible implementation manner of the fourth aspect, the sending module is specifically configured to send at least two pieces of virtual bandwidth configuration information to the UE, and the sending module is further configured to send first configuration information to the UE, where the first configuration information is used for instructing the UE to perform signal reception or signal processing according to a virtual bandwidth corresponding to at least one piece of virtual bandwidth configuration information in the at least two pieces of virtual bandwidth configuration information.

With reference to the fourth aspect or the first possible implementation manner of the fourth aspect, in a second possible implementation manner of the fourth aspect, the sending module is further configured to send, to the UE, second configuration information that is used for performing signal reception and/or signal processing on the virtual bandwidth, where the second configuration information is configuration information of the signal or signal processing.

With reference to the fourth aspect, in a third possible implementation manner of the fourth aspect, the virtual bandwidth configuration information is used for instructing the UE to perform at least one type of signal reception or signal processing on each virtual bandwidth in the virtual bandwidth corresponding to the at least one piece of virtual bandwidth configuration information.

With reference to the fourth aspect, or any one of the first to third possible implementation manners of the fourth aspect, in a fourth possible implementation manner of the fourth aspect, the signal reception and/or signal processing includes at least one of the following signal reception or signal processing:

channel state information reference signal CSI-RS reception, cell-specific reference signal CRS reception, physical downlink control channel PDCCH search, enhanced physical downlink control channel EPDCCH search, channel state information CSI measurement, radio resource management RRM measurement, CSI feedback, physical downlink shared channel PDSCH reception, physical hybrid automatic repeat request indicator channel PHICH reception, enhanced physical hybrid automatic repeat request indicator channel EPHICH reception, physical multicast channel PMCH reception, and common signal reception, where the common signal reception includes at least one of the following:

physical broadcast channel PBCH reception, enhanced physical broadcast channel ePBCH reception, primary synchronization signal PSS/secondary synchronization signal SSS reception, and discovery signal reception.

With reference to the fourth aspect, in a fifth possible implementation manner of the fourth aspect, the virtual bandwidth configuration information includes at least one piece of information of a size, position information, a type, and downlink transmit power information of the virtual bandwidth.

With reference to the fifth possible implementation manner of the fourth aspect, in a sixth possible implementation manner of the fourth aspect, the position information of the virtual bandwidth includes starting position information of the virtual bandwidth or central frequency information of the virtual bandwidth, where a starting position of the virtual bandwidth is a starting position of any one resource block group in resource block groups obtained by dividing according to the downlink maximum available bandwidth or the downlink transmission bandwidth.

With reference to the fifth possible implementation manner of the fourth aspect, in a seventh possible implementation manner of the fourth aspect, the size of the virtual bandwidth equals a sum of sizes of at least one resource block group in resource block groups obtained by dividing according to the downlink maximum available bandwidth or the downlink transmission bandwidth; or the size of the virtual bandwidth is predefined.

With reference to the fifth possible implementation manner of the fourth aspect, in an eighth possible implementation manner of the fourth aspect, the downlink transmit power information includes transmit power of a CRS or a reduced cell-specific reference signal RCRS.

With reference to the fifth possible implementation manner of the fourth aspect, in a ninth possible implementation manner of the fourth aspect, the type of the virtual bandwidth is at least one of a centralized virtual bandwidth, a discontinuous virtual bandwidth, and a distributed virtual bandwidth.

With reference to the fifth possible implementation manner of the fourth aspect, in a tenth possible implementation manner of the fourth aspect, when the sending module sends two or more pieces of virtual bandwidth configuration information to the UE, at least one of position information, sizes, types, and downlink transmit power information corresponding to virtual bandwidths indicated by any two pieces of virtual bandwidth configuration information in the at least two pieces of virtual bandwidth configuration information is different.

With reference to the fourth aspect, in an eleventh possible implementation manner of the fourth aspect, the sending module is specifically configured to send, to the UE, the at least one piece of virtual bandwidth configuration information carried in broadcast message signaling or multicast signaling or UE specific signaling.

With reference to the fourth aspect, in a twelfth possible implementation manner of the fourth aspect, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a physical common control channel.

With reference to the fourth aspect, or any one of the first to twelfth possible implementation manners of the fourth aspect, in a thirteenth possible implementation manner of the fourth aspect, the sending module is specifically configured to send, to the UE, virtual bandwidth configuration information corresponding to each CSI-RS in at least one CSI-RS, so that the UE receives a corresponding CSI-RS according to at least one virtual bandwidth in the virtual bandwidth indicated by the at least one piece of virtual bandwidth configuration information, where the CSI-RS is a non zero power channel state information reference signal NZP CSI-RS or a zero power channel state information reference signal ZP CSI-RS.

With reference to the thirteenth possible implementation manner of the fourth aspect, in a fourteenth possible implementation manner of the fourth aspect, when the CSI-RS is an NZP CSI-RS, a sequence of the NZP CSI-RS is generated based on a preset formula and according to a virtual bandwidth corresponding to the NZP CSI-RS; or a sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula; or a sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

With reference to the thirteenth possible implementation manner of the fourth aspect, in a fifteenth possible implementation manner of the fourth aspect, when the CSI-RS is an NZP CSI-RS, the sending module is further configured to send, to the UE, transmit power information corresponding to the NZP CSI-RS on a virtual bandwidth corresponding to the virtual bandwidth configuration information.

With reference to the fourth aspect, or any one of the first to twelfth possible implementation manners of the fourth aspect, in a sixteenth possible implementation manner of the fourth aspect, the sending module is specifically configured to send, to the UE, virtual bandwidth configuration information corresponding to each CSI-IM in at least one channel state information interference measurement CSI-IM.

With reference to the fourth aspect, or any one of the first to twelfth possible implementation manners of the fourth aspect, in a seventeenth possible implementation manner of the fourth aspect, the sending module is specifically configured to send, to the UE, virtual bandwidth configuration information corresponding to each CSI process in at least one channel state information process CSI process, so that the UE performs measurement or measurement feedback of the CSI according to the virtual bandwidth configuration information corresponding to each CSI process.

With reference to the seventeenth possible implementation manner of the fourth aspect, in an eighteenth possible implementation manner of the fourth aspect, the starting position of the virtual bandwidth is a starting position of any one subband in subbands obtained by dividing according to the downlink maximum available bandwidth or the downlink transmission bandwidth; and/or the size of the virtual bandwidth equals a sum of sizes of at least one subband in the subbands obtained by dividing according to the downlink maximum available bandwidth or the downlink transmission bandwidth.

With reference to the seventeenth possible implementation manner of the fourth aspect, in a nineteenth possible implementation manner of the fourth aspect, a virtual bandwidth corresponding to the CSI process is covered within a range of a virtual bandwidth of an NZP CSI-RS and/or a CSI-IM corresponding to the CSI process; or the virtual bandwidth configuration information corresponding to the CSI process is virtual bandwidth configuration information of an NZP CSI-RS and/or a CSI-IM corresponding to the CSI process.

With reference to the fourth aspect, or any one of the first to twelfth and seventeenth possible implementation manners of the fourth aspect, in a twentieth possible implementation manner of the fourth aspect, the virtual bandwidth configuration information is used for indicating a corresponding virtual bandwidth used for performing resource allocation for the UE, where there is at least one corresponding virtual bandwidth used for performing resource allocation for the UE.

With reference to the twentieth possible implementation manner of the fourth aspect, in a twenty-first possible implementation manner of the fourth aspect, the corresponding virtual bandwidth used for performing resource allocation for the UE and a virtual bandwidth corresponding to the CSI process are independently configured.

With reference to the twentieth possible implementation manner of the fourth aspect, in a twenty-second possible implementation manner of the fourth aspect, a resource included to perform resource allocation once for the UE is a resource on at least one virtual bandwidth.

With reference to the twentieth possible implementation manner of the fourth aspect, in a twenty-third possible implementation manner of the fourth aspect, the sending module is further configured to send resource allocation information to the UE, where the resource allocation information includes index information of at least one virtual bandwidth corresponding to the resource.

With reference to the twentieth possible implementation manner of the fourth aspect, in a twenty-fourth possible implementation manner of the fourth aspect, the sending module is further configured to send resource allocation information to the UE, where a length of the resource allocation information is determined by a size of the virtual bandwidth.

With reference to the fourth aspect, in a twenty-fifth possible implementation manner of the fourth aspect, when the sending module sends at least two pieces of virtual bandwidth configuration information to the UE, the sending module is further configured to send scheduling information of inter-virtual bandwidth to the UE, where the scheduling information includes index information that is used for indicating a virtual bandwidth corresponding to the scheduling information and that is sent by the base station to the UE.

With reference to the twentieth possible implementation manner of the fourth aspect, in a twenty-sixth possible implementation manner of the fourth aspect, a size of a resource block group in the virtual bandwidth is determined according to the virtual bandwidth or the downlink maximum available bandwidth or the downlink transmission bandwidth.

With reference to the fourth aspect, or any one of the first to twelfth possible implementation manners of the fourth aspect, in a twenty-seventh possible implementation manner of the fourth aspect, the sending module is further configured to send, to the UE, third configuration information of rate matching and quasi co-location assumption corresponding to the virtual bandwidth.

With reference to the fourth aspect, or any one of the first to twelfth possible implementation manners of the fourth aspect, in a twenty-eighth possible implementation manner of the fourth aspect, the sending module is further configured to send, to the UE, fourth configuration information of quasi co-location assumption corresponding to the virtual bandwidth, where the fourth configuration information includes at least one of the following information: a quantity of ports of a CRS, position information of a subframe of a CRS, position information of a first symbol of a PDSCH, multicast/broadcast single frequency network MBSFN configuration information in the virtual bandwidth, and ZP CSI-RS configuration information in the virtual bandwidth.

With reference to the fourth aspect, or any one of the first to twelfth possible implementation manners of the fourth aspect, in a twenty-ninth possible implementation manner of the fourth aspect, the sending module is further configured to send, to the UE, fifth configuration information of quasi co-location assumption corresponding to the virtual bandwidth, where the fifth configuration information includes at least one of the following information: configuration information of a CSI-RS that is quasi co-located with a demodulation reference signal DM RS and configuration information of a CRS that is quasi co-located with a CSI-RS.

With reference to any one of the twenty-seventh to twenty-ninth possible implementation manners of the fourth aspect, in a thirtieth possible implementation manner of the fourth aspect, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

With reference to the fourth aspect, or any one of the first to twelfth possible implementation manners of the fourth aspect, in a thirty-first possible implementation manner of the fourth aspect, the sending module is further configured to send sixth configuration information to the UE, where the sixth configuration information is used for indicating a transmission resource of a physical uplink control channel PUCCH acknowledgement signal/negative-acknowledgement signal ACK/NACK corresponding to the virtual bandwidth.

At least one of the multiple technical solutions above has the following beneficial effects:

In the embodiments of the present invention, at least one piece of independent virtual bandwidth configuration information is configured, a base station may flexibly configure a transmission bandwidth for a signal and a bandwidth for signal processing such as measurement and feedback required by UE, and signal reception and/or signal processing no longer needs to be performed according to a fixed bandwidth, thereby reducing overheads and complexity of signal reception and processing, so that signal reception and/or signal processing becomes more flexible.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
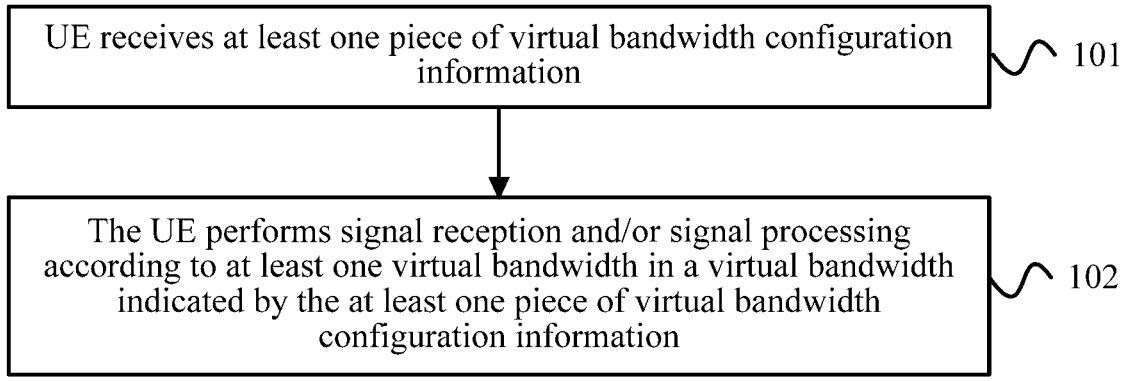
FIG. 1 is a schematic flowchart of a bandwidth configuration method provided in Embodiment 1 of the present invention.

FIG. 1 is a schematic flowchart of a bandwidth configuration method provided in Embodiment 1 of the present invention. The method is implemented by a bandwidth configuration apparatus configured in UE. As shown in FIG. 1, the method includes:

Step 101. The UE receives at least one piece of virtual bandwidth configuration information.

Specifically, the UE receives at least one piece of virtual bandwidth configuration information sent by a base station. Optionally, the "at least one" may also be "at least two". The virtual bandwidth configuration information is used for indicating a configuration of a virtual bandwidth. The virtual bandwidth configuration information and the virtual bandwidth are in a one-to-one relationship, that is, one piece of virtual bandwidth configuration information indicates a configuration of one virtual bandwidth. Receiving, by the UE, virtual bandwidth configuration information may specifically include:

a. receiving, by the UE, virtual bandwidth configuration information, and then performing, by the UE, various types of signal reception and signal processing on a virtual bandwidth; and b. receiving, by the UE, virtual bandwidth configuration information corresponding to a signal or a channel or signal processing, and then performing, by the UE, signal reception or reception of a corresponding channel signal or signal processing according to the virtual bandwidth configuration information of the signal.

The virtual bandwidth configuration information may be carried in physical layer signaling and/or higher layer signaling, and each piece of virtual bandwidth configuration information is configured independently. For example, the virtual bandwidth configuration information is carried by using only physical layer signaling or by using only higher layer signaling, or multiple pieces of candidate virtual bandwidth configuration information are carried by using higher layer signaling, and one of the multiple pieces of candidate virtual bandwidth configuration information is configured, by using physical layer signaling, as virtual bandwidth configuration information in actual use.

Step 102. The UE performs signal reception and/or signal processing according to at least one virtual bandwidth in a virtual bandwidth indicated by the at least one piece of virtual bandwidth configuration information.

Specifically, each virtual bandwidth is a part or all of a downlink maximum available bandwidth or a downlink transmission bandwidth, and the downlink maximum available bandwidth is a maximum bandwidth available for downlink transmission. The downlink transmission bandwidth includes a downlink system bandwidth configured by a base station by using a master information block (MIB for short). Specifically, a virtual bandwidth indicated by each piece of virtual bandwidth configuration information may be independent, and attribute information, such as a size, position information, a type, and downlink transmit power information of each virtual bandwidth may be independently configured, and is not related to another virtual bandwidth. Alternatively, for multiple virtual bandwidths, at least one piece of attribute information, such as a size, position information, a type, and downlink transmit power information of a corresponding virtual bandwidth is jointly configured or predefined.

Optionally, the UE receives at least one piece of virtual bandwidth configuration information. The at least one piece of virtual bandwidth configuration information includes virtual bandwidth configuration information corresponding to different subframe sets. That is, for each subframe set, virtual bandwidth configuration information may be configured independently, so that the virtual bandwidth configuration information indicates a virtual bandwidth on the subframe set.

In this embodiment of the present invention, at least one piece of independent virtual bandwidth configuration information is configured, a base station may flexibly configure a bandwidth for signal reception for UE, a bandwidth that is required by the UE and that is for signal processing such as measurement and feedback, and the like, and signal reception and/or signal processing no longer needs to be performed according to a fixed bandwidth, so that overheads and complexity of signal reception and signal processing are saved and reduced, and overheads and complexity of signal reception and processing feedback may be flexibly controlled.

Optionally, in all embodiments of the present invention, step 102 in which the UE performs signal reception and/or signal processing according to at least one virtual bandwidth in the virtual bandwidth indicated by the at least one piece of virtual bandwidth configuration information may include that: the UE performs signal reception or signal processing on each virtual bandwidth in all virtual bandwidths corresponding to the at least one piece of virtual bandwidth configuration information.

Embodiment 2

Figure 2:
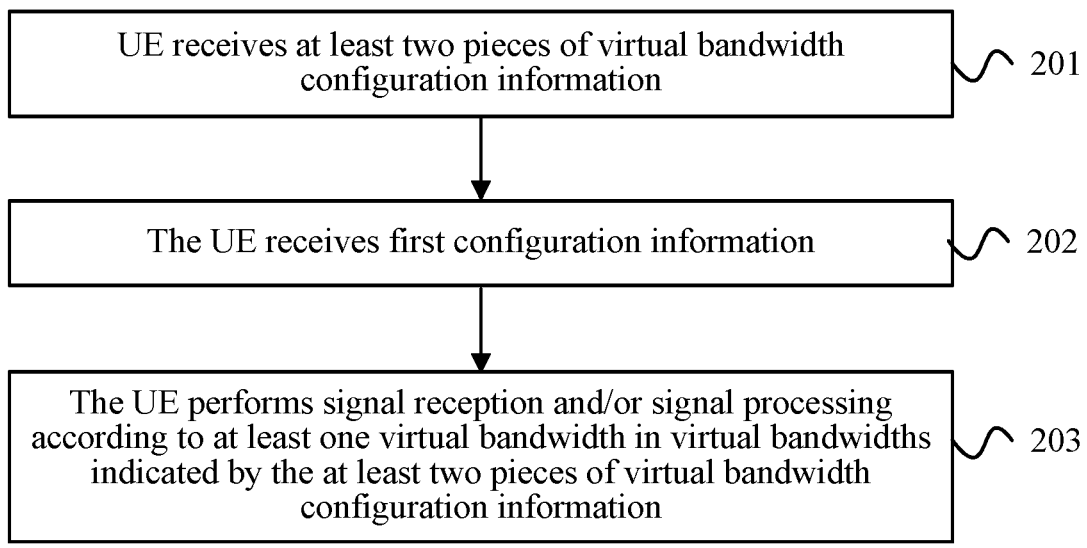
FIG. 2 is a schematic flowchart of a bandwidth configuration method provided in Embodiment 2 of the present invention.

In the foregoing embodiment, in step 101, UE receives at least one piece of virtual bandwidth configuration information, where there are at least two pieces of virtual bandwidth configuration information. When the UE receives the at least two pieces of virtual bandwidth configuration information, as shown in FIG. 2, the method may include:

Step 201. The UE receives the at least two pieces of virtual bandwidth configuration information.

Step 202. The UE receives first configuration information.

Specifically, the first configuration information is used for instructing the UE to perform signal reception or signal processing according to a virtual bandwidth corresponding to at least one piece of virtual bandwidth configuration information in the at least two pieces of virtual bandwidth configuration information.

Step 202 is optional, and step 203 may be directly performed.

Step 203. The UE performs signal reception and/or signal processing according to at least one virtual bandwidth in virtual bandwidths indicated by the at least two pieces of virtual bandwidth configuration information.

Specifically, the UE may aggregate two or more virtual bandwidths in the virtual bandwidths indicated by the at least two pieces of virtual bandwidth configuration information, and perform signal reception and/or signal processing on an aggregated bandwidth.

In this embodiment of the present invention, a base station may configure that UE performs signal reception or signal processing on different virtual bandwidths according to different first configuration information, and the UE does not need to perform signal reception or signal processing on an entire downlink transmission bandwidth or downlink maximum available bandwidth by using same first configuration information, so that higher flexibility can be achieved and complexity of processing of the UE can be reduced.

Embodiment 3

Figure 3:
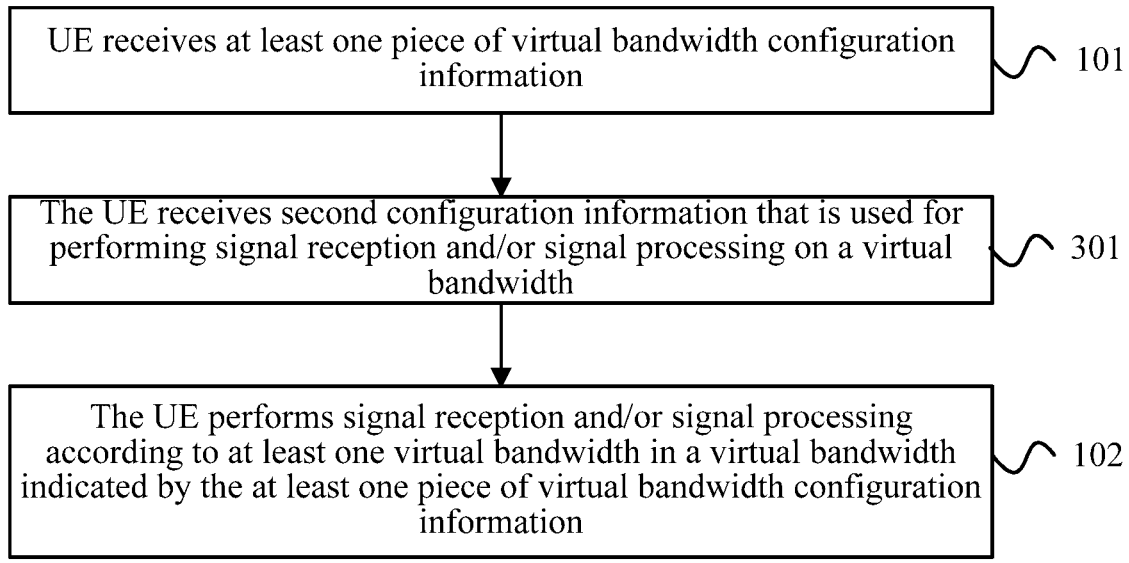
FIG. 3 is a schematic flowchart of a bandwidth configuration method provided in Embodiment 3 of the present invention.

In Embodiment 3 of the present invention, optimization is made on the basis of the foregoing embodiments, and as shown in FIG. 3, the method may further include:

Step 301. The UE receives second configuration information that is used for performing signal reception and/or signal processing on the virtual bandwidth.

Specifically, the second configuration information is configuration information of the signal or signal processing, and may be configured independently from the virtual bandwidth configuration information, or may be predefined, and sent to the UE by the base station. In addition, the second configuration information may be configuration information of a parameter such as information about a scrambling code, port information, a time domain parameter, and a frequency domain parameter of the signal, or may be configuration information of signal processing such as channel estimation, signal detection, and data demodulation, which is not limited herein.

Optionally, in all the embodiments of the present invention, the virtual bandwidth configuration information may be used for instructing the UE to perform at least one type of signal reception or signal processing on each virtual bandwidth in the virtual bandwidth corresponding to the at least one piece of virtual bandwidth configuration information.

Further, in all the embodiments of the present invention, the signal reception and/or signal processing includes at least one of the following signal reception or signal processing: channel state information reference signal (CSI-RS for short) reception, cell-specific reference signal (CRS for short) reception, physical downlink control channel (PDCCH for short) search, enhanced physical downlink control channel (EPDCCH for short) search, channel state information (CSI for short) measurement, radio resource management (RRM for short) measurement, CSI feedback, physical downlink shared channel (PDSCH for short) reception, physical hybrid automatic repeat request indicator channel (PHICH for short) reception, enhanced physical hybrid automatic repeat request indicator channel (EPHICH for short) reception, physical multicast channel (PMCH for short) reception, and common signal reception, where the common signal reception includes at least one of the following: physical broadcast channel (PBCH for short) reception, enhanced physical broadcast channel (ePBCH for short) reception, primary synchronization signal (PSS for short)/secondary synchronization signal (SSS for short) reception, and discovery signal reception. Therefore, for any type of signal reception or signal processing described above, the UE may perform signal reception or signal processing according to different virtual bandwidths, and the UE may perform different signal reception or signal processing according to different virtual bandwidths, where the different signal reception or signal processing includes different channel reception or channel processing.

Further, in all the embodiments of the present invention, the virtual bandwidth configuration information includes at least one piece of information of a size, position information, a type, and downlink transmit power information of the virtual bandwidth, and the at least one information is separately described below:

a. The position information of the virtual bandwidth includes starting position information of the virtual bandwidth or central frequency information of the virtual bandwidth. A starting position of the virtual bandwidth is preferably a starting position of any one resource block group in resource block groups (RBG for short) obtained by dividing according to a downlink maximum available bandwidth or a downlink transmission bandwidth. In this embodiment of the present invention, an entire resource block group may be included in a virtual bandwidth.

Optionally, the central frequency information of the virtual bandwidth is any position in the downlink maximum available bandwidth or the downlink transmission bandwidth. Preferably, the downlink maximum available bandwidth or the downlink transmission bandwidth is divided into N average parts, and the central frequency information of the virtual bandwidth is a central frequency of one part thereof. For example, the central frequency information of the virtual bandwidth is a central frequency of the entire downlink maximum available bandwidth or downlink transmission bandwidth, or the downlink maximum available bandwidth or the downlink transmission bandwidth is divided into 2 average parts, and the central frequency of the virtual bandwidth is a central frequency of the first part or the second part.

Preferably, a position of the central frequency of the virtual bandwidth may be a position of a subcarrier, meeting that a frequency of the subcarrier is a positive number multiple of 100 kilohertz (KHz for short), in the downlink maximum available bandwidth or the downlink transmission bandwidth.

When virtual bandwidths of two CSI-RSs overlap, REs that may be corresponding to the two CSI-RSs may overlap in an overlapped region, or the two CSI-RSs may share some resource elements (RE for short) in an overlapped region, or in an overlapped region, when REs corresponding to the two CSI-RSs overlap, a CSI-RS with a lower priority is not sent. A priority of a CSI-RS is predefined, or a priority of a CSI-RS is implicitly notified, for example, a CSI-RS with a low index number has a high priority, or a priority of a CSI-RS is explicitly notified, for example, a base station notifies UE of a priority of each CSI-RS.

Figure 10:
FIG. 10 is an exemplary diagram of a discontinuous virtual bandwidth provided in an embodiment of the present invention.
Figure 11:
FIG. 11 is an exemplary diagram of a distributed virtual bandwidth provided in an embodiment of the present invention.

Moreover, starting position information of the virtual bandwidth may also be any position in the downlink maximum available bandwidth or the downlink transmission bandwidth. The downlink transmission bandwidth may be a downlink system bandwidth of a serving cell.

b. The size of the virtual bandwidth, preferably, equals a sum of sizes of at least one resource block group in resource block groups obtained by dividing according to the downlink maximum available bandwidth or the downlink transmission bandwidth; or the size of the virtual bandwidth is predefined. For example, the size of the virtual bandwidth is one of standard downlink transmission bandwidths, for example, 1.4/3/5/10/15/ 20 megahertz (MHz for short), or 6/15/25/50/75/100 physical resource blocks (PRB for short). In addition, the size of the virtual bandwidth may also be smaller than or equal to any size of the downlink maximum available bandwidth or the downlink transmission bandwidth, and is not limited herein. In this embodiment of the present invention, an entire resource block group may be included in a virtual bandwidth.

c. The downlink transmit power information includes transmit power of a CRS or a reduced cell-specific reference signal (RCRS for short). The downlink transmit power information corresponding to the virtual bandwidth may be the same as or different from downlink transmit power information on the downlink maximum available bandwidth or the downlink transmission bandwidth. For example, the downlink transmit power information on the downlink maximum available bandwidth or the downlink transmission bandwidth is 46 decibels above one milliwatt (dBm for short), while the downlink transmit power information corresponding to the virtual bandwidth may be 46 dBm, or 40 dBm, or 23 dBm. The downlink transmit power information may be transmit power information of a downlink reference signal, for example, CRS transmit power or CSI-RS transmit power. In this embodiment of the present invention, downlink transmit power on different bandwidths may be set more flexibly.

d. The type of the virtual bandwidth is at least one of a centralized virtual bandwidth, a discontinuous virtual bandwidth, and a distributed virtual bandwidth. If the type of the virtual bandwidth is a discontinuous virtual bandwidth, a quantity of discontinuous bandwidths included in the virtual bandwidth is predefined. For example, at most 2 discontinuous bandwidth parts may be included, and in this case, the size and position information of the virtual bandwidth include a size and position information of each discontinuous bandwidth. If the type of the virtual bandwidth is a distributed virtual bandwidth, a distance between distributed virtual bandwidth components and a size of each virtual bandwidth component are predefined or configured by a base station for UE. The type of the virtual bandwidth may be continuous or discontinuous. For example, the downlink transmission bandwidth is 10 MHz, and the virtual bandwidth may be a continuous bandwidth of 5 MHz, or may be formed by two discontinuous bandwidths of 2.5 MHz, as shown in FIG. 10. The virtual bandwidth may be centralized or distributed. For example, the virtual bandwidth may be centralized continuous 5 MHz, or may be distributed, for example, the virtual bandwidth is a bandwidth of which a starting position is a starting physical resource block (PRB for short) of a first resource block group obtained by means of distributed mapping of a downlink transmission bandwidth, and a bandwidth size is the first and second resource block groups, or as shown in FIG. 11. The virtual bandwidth configuration information may further include information about a manner of mapping from a VRB (virtual resource block) to a PRB.

Further, when the UE receives at least two pieces of virtual bandwidth configuration information, at least one of position information, sizes, types, and downlink transmit power information corresponding to virtual bandwidths indicated by any two pieces of virtual bandwidth configuration information in the at least two pieces of virtual bandwidth configuration information is different. When the virtual bandwidth configuration information is used for indicating a virtual bandwidth corresponding to at least one type of signal reception or signal processing, position information, sizes, types, and downlink transmit power information of virtual bandwidths corresponding to different signal reception or signal processing may be configured independently or configured jointly. The virtual bandwidths corresponding to different signal reception or signal processing may also be the same, which is not limited herein.

Optionally, in all the embodiments of the present invention, the receiving, by UE, at least one piece of virtual bandwidth configuration information includes: receiving, by the UE, the at least one piece of virtual bandwidth configuration information carried in broadcast message signaling or multicast signaling or UE specific signaling. The broadcast message signaling or multicast signaling or UE specific signaling may specifically be physical layer signaling and/or higher layer signaling, and may be carried only by using the physical layer signaling, or carried only by using the higher layer signaling, or multiple pieces of candidate virtual bandwidth configuration information are carried by using the higher layer signaling, and one of the multiple pieces of candidate virtual bandwidth configuration information is configured, by using the physical layer signaling, as virtual bandwidth configuration information in actual use.

When the UE receives virtual bandwidth configuration information carried in the broadcast signaling, the broadcast signaling is at least one of a MIB and a system information block type 2 (SIB2 for short). When the UE receives virtual bandwidth configuration information carried in the multicast signaling, the multicast signaling includes at least one of multimedia broadcast multicast service (MBMS for short) control signaling and multicast signaling that is sent by a primary cell to the UE and is used for indicating configuration information of a secondary cell. When the UE receives virtual bandwidth configuration information carried in the UE specific signaling, the UE specific signaling includes at least one of UE specific Radio Resource Control (RRC for short) signaling and UE specific signaling that is sent by a primary cell to the UE and is used for indicating configuration information of a secondary cell.

Specifically, in all the embodiments of the present invention, the virtual bandwidth configuration information may include information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a common control channel. The common signal and/or common channel may be transmitted on all virtual bandwidths or transmitted on only some virtual bandwidths, for example, transmitted only on one virtual bandwidth. When the common signal and/or common channel is transmitted on multiple virtual bandwidths, common signals and/or common channels transmitted on different virtual bandwidths may have a same configuration or parameter or different configurations or parameters. In this embodiment of the present invention, it may be flexibly configured that UE detects or receives a common signal and/or a common channel on a virtual bandwidth.

Embodiment 4

Embodiment 4 of the present invention provides a bandwidth configuration method, which is a specific application scenario based on the foregoing embodiment, and is specifically used for configuring a virtual bandwidth for a CSI-RS.

In this embodiment, the at least one piece of virtual bandwidth configuration information is virtual bandwidth configuration information corresponding to each CSI-RS in at least one CSI-RS, and performing, by the UE, signal reception according to at least one virtual bandwidth in the virtual bandwidth indicated by the at least one piece of virtual bandwidth configuration information specifically includes: receiving, by the UE, a corresponding CSI-RS according to the configured virtual bandwidth, where the CSI-RS is a non zero power channel state information reference signal (non zero power CSI-RS, NZP CSI-RS for short) or zero power channel state information reference signal (zero power CSI-RS, ZP CSI-RS for short). When there are at least two CSI-RSs that are configured by the base station and received by the UE, one virtual bandwidth may separately be configured for each CSI-RS, and virtual bandwidths of different CSI-RSs may be configured independently or configured jointly.

Further, when the CSI-RS is an NZP CSI-RS, there are the following implementation manners for a sequence of the NZP CSI-RS:

Manner 1: The sequence of the NZP CSI-RS is generated based on a preset formula and according to a virtual bandwidth corresponding to the NZP CSI-RS.

Manner 2: The sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula.

Manner 3: The sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

The preset formula based on which the sequence of the NZP CSI-RS is generated is as follows:

$$r_{l,n_s}(m) = \frac{1}{\sqrt{2}}(1 - 2 \times c(2m)) + j\frac{1}{\sqrt{2}}(1 - 2 \times c(2m+1)), \quad (1)$$

$$m = 0, 1, \ldots, N_{RB}^{maxDL} - 1$$

where $n_s$ is a number of a time slot in a radio frame, l is a number of a symbol in a time slot, c(•) is one predefined pseudo random sequence, and $N_{RB}^{maxDL}$ is a number of a maximum resource block (RB for short) corresponding to the downlink transmission bandwidth. At the beginning of each symbol, the pseudo random sequence c(•) is initialized according to the following formula:

$$c(\bullet) = 2^{10} \times (7 \times (n_s+1)+l+1) \times (2 \times N_{ID}^{CSI}+1) + 2 \times N_{ID}^{CSI} + N_{CP} \quad (2)$$

where when a normal cyclic prefix (CP for short) is used, $N_{CP}=1$, and when an extended CP is used, $N_{CP}=0$; and $N_{ID}^{CSI}$ is a number of a CSI-RS.

To generate the sequence of the NZP CSI-RS in Manner 1, $N_{RB}^{maxDL}$ is replaced with a quantity of RBs corresponding to a virtual bandwidth. To generate the sequence of the NZP CSI-RS in Manner 2 or Manner 3, the sequence of the NZP CSI-RS is truncated according to a position of an RB of a virtual bandwidth in the downlink transmission bandwidth or downlink maximum available bandwidth.

Further, when the CSI-RS is an NZP CSI-RS, the UE receives transmit power information corresponding to the NZP CSI-RS on a virtual bandwidth corresponding to the virtual bandwidth configuration information, where transmit power information corresponding to different NZP CSI-RSs may be independent, and the transmit power information may be included in the virtual bandwidth configuration information, or may be transmit power information independent from the virtual bandwidth configuration information. In this case, when the NZP CSI-RS is transmitted by the base station to the UE, corresponding transmit power information is only used on a virtual bandwidth corresponding to the NZP CSI-RS to perform transmission. For example, transmit power corresponding to one NZP CSI-RS is A dBm, and transmit power corresponding to another NZP CSI-RS is B dBm, where A and B may be completely independent.

Specifically, based on the foregoing embodiment, preferably, performing, by the UE, signal processing according to the virtual bandwidth indicated by the virtual bandwidth configuration information includes: performing, by the UE, RRM measurement according to a virtual bandwidth of the CSI-RS. The RRM measurement includes measurement of at least one of reference signal received power (RSRP for short), reference signal received quality (RSRQ for short), and a received signal strength indicator (RSSI for short). Optionally, the UE reports, to the base station, a result that is obtained by performing RRM measurement according to the virtual bandwidth of the CSI-RS.

In this embodiment, a virtual bandwidth is configured for each CSI-RS by using at least one piece of virtual bandwidth configuration information, so that the different CSI-RSs correspond to the different virtual bandwidths, and these virtual bandwidths are independent of each other; therefore, it is implemented that the CSI-RSs may be transmitted on different virtual bandwidths, and it is not required that all CSI-RSs must be transmitted on an entire downlink transmission bandwidth or maximum downlink available bandwidth, so that overheads of a reference signal are reduced; for generation of a CSI-RS sequence, it is also not required to generate a CSI-RS sequence having a fixed length only according to an entire downlink transmission bandwidth or downlink maximum available bandwidth, and instead generation may be performed according to the configured virtual bandwidth; in addition, signal processing such as RRM measurement also only needs to be performed on a corresponding virtual bandwidth, so that complexity of measurement and feedback is reduced.

Embodiment 5

Embodiment 5 of the present invention provides a bandwidth configuration method, which is another specific application scenario based on the foregoing embodiment, and is specifically used for configuring a virtual bandwidth for channel state information interference measurement (CSI-IM for short).

In this embodiment, the receiving, by UE, at least one piece of virtual bandwidth configuration information includes: receiving, by the UE, virtual bandwidth configuration information corresponding to each CSI-IM in at least one CSI-IM.

When the base station configures a CSI-IM for the UE, each CSI-IM may be corresponding to one piece of virtual bandwidth configuration information, and virtual bandwidth configuration information corresponding to different CSI-IMs may be independent. These CSI-IMs may be used for different coordinated multi point transmission/reception (CoMP for short) transmission assumption.

When there are at least two CSI-IMs, virtual bandwidths of any two CSI-IMs may overlap. When virtual bandwidths of two CSI-IMs overlap, resource elements (RE for short) corresponding to the two CSI-IMs may overlap in an overlapped region, or the two CSI-IMs may share some REs.

In this embodiment, each CSI-IM corresponds to independent virtual bandwidth configuration information, so that during interference coordination between cells, each cell uses a respective corresponding virtual bandwidth of the cell, so that UE does not need to perform measurement of interference or channel state information according to an entire downlink transmission bandwidth or downlink maximum available bandwidth, and instead, may perform measurement of interference or channel state information according to different virtual bandwidths; moreover, a result of broadband measurement of the UE can accurately reflect an actual channel state, and actual overheads of measurement and feedback of the UE are close to actually required overheads, thereby further reducing complexity of the UE and improving accuracy of measurement.

Embodiment 6

Embodiment 6 of the present invention provides a bandwidth configuration method, which is still another specific application scenario based on the foregoing embodiment, and is specifically used for configuring a virtual bandwidth for a channel state information process (CSI-Process for short). Each CSI process corresponds to a combination of one NZP CSI-RS and one CSI-IM, and UE measures a channel on the NZP CSI-RS and performs interference measurement on the CSI-IM, and then calculates, according to the measured channel and interference obtained by means of measurement, CSI information corresponding to a corresponding CSI process.

In this embodiment, the at least one piece of virtual bandwidth configuration information is virtual bandwidth configuration information corresponding to each CSI process in at least one CSI process, and the performing, by the UE, signal processing according to at least one virtual bandwidth in the virtual bandwidth indicated by the at least one piece of virtual bandwidth configuration information includes: performing, by the UE, measurement or measurement feedback of the CSI according to the virtual bandwidth configuration information corresponding to each CSI process. The "at least one" includes "at least two", that is, the at least one piece of virtual bandwidth configuration information may be virtual bandwidth configuration information corresponding to each CSI process in at least two CSI processes; in this case, a virtual bandwidth corresponding to each CSI process in the at least two CSI processes may be configured independently.

Optionally, a starting position of the virtual bandwidth is a starting position of any one subband in subbands obtained by dividing according to a downlink maximum available bandwidth or a downlink transmission bandwidth; and/or the size of the virtual bandwidth equals a sum of sizes of at least one subband in the subbands obtained by dividing according to the downlink maximum available bandwidth or the downlink transmission bandwidth. That is, a starting position and a size of the virtual bandwidth may be met at the same time, or only one of a starting position and a size may be met.

Optionally, a virtual bandwidth corresponding to the CSI process is covered within a range of a virtual bandwidth of an NZP CSI-RS and/or a CSI-IM corresponding to the CSI process, or the virtual bandwidth configuration information corresponding to the CSI process is virtual bandwidth configuration information of an NZP CSI-RS and/or a CSI-IM corresponding to the CSI process.

Optionally, the UE determines, according to the virtual bandwidth corresponding to the CSI process or the downlink maximum available bandwidth or the downlink transmission bandwidth, at least one of a size of a subband and a size of a subband set that are of the CSI process, and then determines, according to the size of the subband, a quantity of subbands corresponding to the CSI process, and/or determines, according to the size of the subband set, a quantity of subband sets corresponding to the CSI process. When the size of the subband corresponding to the CSI process is determined according to the virtual bandwidth of the CSI process, the size of the subband of the CSI process may be any value, or may be notified or predefined by the base station. When the size of the subband set corresponding to the CSI process is determined according to the virtual bandwidth of the CSI process, the size of the subband set of the CSI process may be any value, or may be notified or predefined by the base station. Alternatively, the UE determines, according to the virtual bandwidth corresponding to the CSI process, at least one of a quantity of subbands and a quantity of subband sets that are of the CSI process, and then determines the size of the subband according to the quantity of the subbands corresponding to the CSI process, and/or determines the size of the subband set according to the quantity of the subband sets corresponding to the CSI process. When the quantity of the subbands corresponding to the CSI process is determined according to the virtual bandwidth of the CSI process, the quantity of the subbands of the CSI process may be any value, and may be notified or predefined by the base station. When the quantity of the subband sets corresponding to the CSI process is determined according to the virtual bandwidth of the CSI process, the quantity of the subband sets of the CSI process may be any value, and may be notified or predefined by the base station. Optionally, when the UE receives virtual bandwidth configuration information of at least two CSI processes, sizes of subbands of the at least two CSI processes are independent.

Optionally, the performing, by the UE, signal processing according to at least one virtual bandwidth in the virtual bandwidth indicated by the at least one piece of virtual bandwidth configuration information includes: measuring and feeding back, by the UE according to the virtual bandwidth corresponding to the CSI process, broadband channel state information CSI corresponding to the CSI process.

In this embodiment, independent virtual bandwidths are configured for different CSI-Processes, so that UE performs, according to a CSI-IM corresponding to a CSI process configured by a base station, interference measurement on a virtual bandwidth, and performs, according to an NZP CSI-RS corresponding to a CSI process configured by the base station, channel measurement on a virtual bandwidth. Measurement and feedback of CSI are not performed on an entire downlink maximum available bandwidth or downlink transmission bandwidth, instead, measurement and feedback of the CSI are performed on different virtual bandwidths, so that complexity of the UE can be reduced, and flexibility of measurement and feedback and data reception of the UE is improved.

Embodiment 7

Embodiment 7 of the present invention provides a bandwidth configuration method, which is yet another specific application scenario based on the foregoing embodiment, and is specifically used for configuring a virtual bandwidth for resource allocation.

In this embodiment, the virtual bandwidth configuration information is used for indicating a corresponding virtual bandwidth used for performing resource allocation for the UE, where there is at least one corresponding virtual bandwidth used for performing resource allocation for the UE. After the corresponding virtual bandwidth used for performing resource allocation for the UE is configured for the UE, and during resource allocation for the UE, only a resource on the corresponding virtual bandwidth is allocated to the UE.

Optionally, in all the embodiments, the corresponding virtual bandwidth used for performing resource allocation for the UE and a virtual bandwidth corresponding to the CSI process are independently configured. A resource included to perform resource allocation once for the UE is a resource on at least one virtual bandwidth. That is, when one virtual bandwidth used for resource allocation is configured for the UE, only a resource on the virtual bandwidth is allocated to the UE. When two or more virtual bandwidths used for resource allocation are configured for the UE, a resource allocated to the UE may be any resource or a combination of any resources on the two or more virtual bandwidths used for resource allocation.

Optionally, when a bandwidth corresponding to one time of resource allocation includes at least two virtual bandwidths, a size of a resource block group and a quantity of resource block groups that are corresponding to the current resource allocation are separately determined according to each virtual bandwidth in the at least two virtual bandwidths or are determined according to a sum of sizes of the at least two virtual bandwidths or are determined according to a downlink transmission bandwidth or a downlink maximum available bandwidth. A quantity of RBs corresponding to each resource block group may be different. For example, a bandwidth corresponding to one time of resource allocation includes two virtual bandwidths that do not overlap, where a first virtual bandwidth includes 2 resource block groups, and each resource block group has a size of 3 RBs, while a second virtual bandwidth includes 2 resource block groups, and each resource block group has a size of 6 RBs. Therefore, when a resource block group of the current resource allocation is separately determined according to each virtual bandwidth, the current resource allocation has 4 resource block groups in total.

Figure 4:
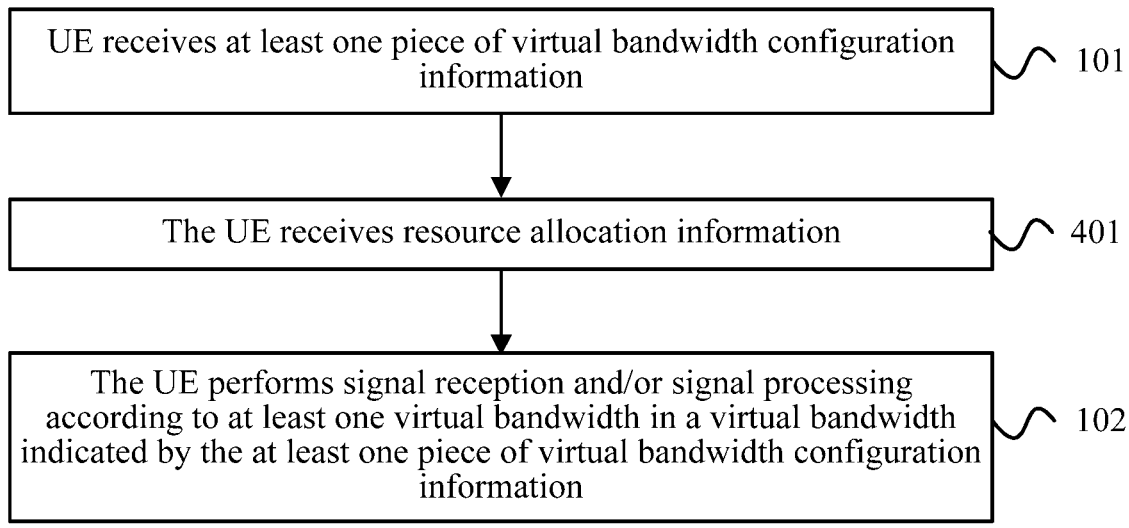
FIG. 4 is a schematic flowchart of a bandwidth configuration method provided in Embodiment 7 of the present invention.

Further, as shown in FIG. 4, after the UE receives at least one piece of virtual bandwidth configuration information, the method may further include:

Step 401. The UE receives resource allocation information.

The resource allocation information includes index information of at least one virtual bandwidth corresponding to a resource allocated to the UE. The "at least one" includes "at least two".

Specifically, the UE receives downlink control information (DCI for short). The DCI is carried in a PDCCH or an ePDCCH, and the DCI includes resource allocation information. The resource allocation information is configured according to the virtual bandwidth. For example, a quantity of PRBs corresponding to the virtual bandwidth is used as a maximum available quantity $N_{RB}^{VDL}$ of PRBs for resource allocation. The UE receives, according to the resource allocation, a channel indicated by the DCI such as a PDSCH on the virtual bandwidth.

Optionally, after the receiving, by the UE, at least one piece of virtual bandwidth configuration information, the method may further include: receiving, by the UE, resource allocation information, where a length of the resource allocation information is determined by a size of the virtual bandwidth. Specifically, during resource allocation for the UE, the base station determines, according to a size of at least one virtual bandwidth used for performing current resource allocation for the UE, a length of the resource allocation information, while when receiving the resource allocation information, the UE also determines, according to the size of the at least one virtual bandwidth used for performing the current resource allocation for the UE, the length of the resource allocation information. For example, the downlink transmission bandwidth is 20 MHz, and the size of the virtual bandwidth used for resource allocation is 5 MHz, so that the length of the resource allocation information used for indicating resource allocation on the virtual bandwidth is determined according to the size of the virtual bandwidth. For example, there are M resource block groups on the virtual bandwidth, where M is a positive integer greater than zero, and therefore the length of the resource allocation information may be M bits. Actually, the method for determining a length of resource allocation information according to a virtual bandwidth is not limited thereto. The at least one virtual bandwidth used for performing the current resource allocation for the UE may be notified by the base station to the UE in a semistatic manner, or may be obtained by the UE by means of blind detection, or may be obtained by the UE by means of detection of the index information of at least one virtual bandwidth used for performing the current resource allocation for the UE.

Optionally, a type of the virtual bandwidth used for performing resource allocation for the UE is independent of a type of resource allocation. For example, the virtual bandwidth is centralized virtual bandwidth, while the resource allocation may be centralized or distributed.

Optionally, in all the embodiments, when the UE receives at least two pieces of virtual bandwidth configuration information, the method further includes: receiving, by the UE, scheduling information of inter-virtual bandwidth, where the scheduling information includes index information for indicating a virtual bandwidth corresponding to a resource scheduled by using the scheduling information, so as to determine the virtual bandwidth corresponding to the current resource allocation. For example, a carrier indicator field (CIF for short) is reused or a new bit is used to indicate a virtual bandwidth corresponding to scheduling information. Optionally, after a quantity of resource block groups corresponding to one time of resource allocation is determined, a length of index information corresponding to the resource allocation is determined according to a corresponding quantity of resource block groups.

In this embodiment, a base station configures at least one piece of virtual bandwidth configuration information for UE, and performs resource allocation for the UE by using a virtual bandwidth indicated by the at least one piece of virtual bandwidth configuration information, and resource allocation is no longer performed only according to a downlink transmission bandwidth or a downlink maximum available bandwidth, so that signaling overheads of resource allocation can be reduced. Moreover, resource scheduling during which sizes of resource blocks are more flexible can be performed for the UE.

Optionally, in all the embodiments, in a scenario, the bandwidth configuration method may further include: receiving, by the UE, third configuration information of rate matching and quasi co-location assumption corresponding to the virtual bandwidth. The third configuration information may be set in the virtual bandwidth configuration information, or may be otherwise configured independently.

Specifically, for a virtual bandwidth used for each time of resource allocation, the base station configures, by using physical layer signaling and/or higher layer signaling, at least one piece of third configuration information of rate matching and quasi co-location assumption for the UE. The third configuration information of rate matching and quasi co-location assumption corresponding to each virtual bandwidth is configured independently. For example, both quantities of third configuration information of rate matching and quasi co-location assumption and specific configuration information may be independent. For example, for the UE, the base station configures 4 pieces of third configuration information of rate matching and quasi co-location assumption for one virtual bandwidth, and configures 2 pieces of third configuration information of rate matching and quasi co-location assumption for the other virtual bandwidth, where the third configuration information of rate matching and quasi co-location assumption for the two virtual bandwidths are independent.

When one virtual bandwidth includes at least two discontinuous bandwidth parts, the base station may configure, for the UE, third configuration information of rate matching and quasi co-location assumption for each bandwidth part. The third configuration information of rate matching and quasi co-location assumption corresponding to each virtual bandwidth part may be configured independently.

When the UE receives scheduling information, the UE determines, according to a virtual bandwidth corresponding to a resource scheduled in the scheduling information, rate matching and quasi co-location assumption corresponding to the virtual bandwidth, and selects, according to the information indicated by the rate matching and quasi co-location assumption in the scheduling information, rate matching and quasi co-location assumption used in current scheduling.

Optionally, in all the embodiments, in still another scenario, the bandwidth configuration method may further include: receiving, by the UE, fourth configuration information of quasi co-location assumption corresponding to the virtual bandwidth, where the fourth configuration information may be set in the virtual bandwidth configuration information, or may be otherwise configured independently. The fourth configuration information includes at least one of the following information: a quantity of ports of a CRS, position information of a subframe of a CRS, position information of a first symbol of a PDSCH, multicast/broadcast single frequency network (MBSFN for short) configuration information in the virtual bandwidth, and ZP CSI-RS configuration information in the virtual bandwidth.

Optionally, in all the embodiments, in still another scenario, the bandwidth configuration method may further include: receiving, by the UE, fifth configuration information of quasi co-location assumption corresponding to the virtual bandwidth, where the fifth configuration information may be set in the virtual bandwidth configuration information, or may be otherwise configured independently. The fifth configuration information includes at least one of the following information: configuration information of a CSI-RS that is quasi co-located with a demodulation reference signal (DM RS for short), and configuration information of a CRS that is quasi co-located with a CSI-RS.

Further, based on the foregoing embodiment, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

In this embodiment of the present invention, a base station may configure, for UE, information about rate matching and/or quasi co-location assumption corresponding to each virtual bandwidth, so that different virtual bandwidths may have different rate matching and/or quasi co-location assumption, and the UE and the base station reach consistent understanding of rate matching and/or quasi co-location assumption on each different node and bandwidth; moreover, configuration of rate matching and/or quasi co-location assumption may be very flexible, so that a limitation that a same configuration is required to be used at all positions on a downlink transmission bandwidth is overcome, thereby reducing overheads of transmission and increasing flexibility.

Optionally, the bandwidth configuration method may further include: receiving, by the UE, sixth configuration information, where the sixth configuration information is used for indicating a transmission resource of a physical uplink control channel (PUCCH for short) acknowledgement signal (ACK for short)/negative-acknowledgement signal (NACK for short) corresponding to the virtual bandwidth. The sixth configuration information may be a parameter $N_{PUCCH}^{(1)}$ used for indicating a transmission resource of PUCCH ACK/NACK corresponding to the virtual bandwidth and/or a hybrid automatic repeat request acknowledgement signal resource offset (Hybrid Automatic Repeat Request Acknowledgement resource offset, HARQ-ACK resource offset for short). The UE determines the transmission resource of the PUCCH ACK/NACK corresponding to the virtual bandwidth according to the sixth configuration information. A resource used for transmitting the PUCCH ACK/NACK corresponding to the virtual bandwidth is configured for different virtual bandwidths, so that a limitation that only one resource used for transmitting PUCCH ACK/NACK can be configured on a downlink transmission bandwidth or downlink maximum available bandwidth can be overcome, and a flexibility of configuring a resource used for transmitting PUCCH ACK/NACK corresponding to each virtual bandwidth in a case of configuring a virtual bandwidth can be increased, thereby reducing a probability of collision between transmission resources corresponding to different ACK/NACK.

Embodiment 8

Corresponding to the foregoing method embodiment, an embodiment of the present invention further provides an embodiment of the following bandwidth configuration method.

Figure 5:
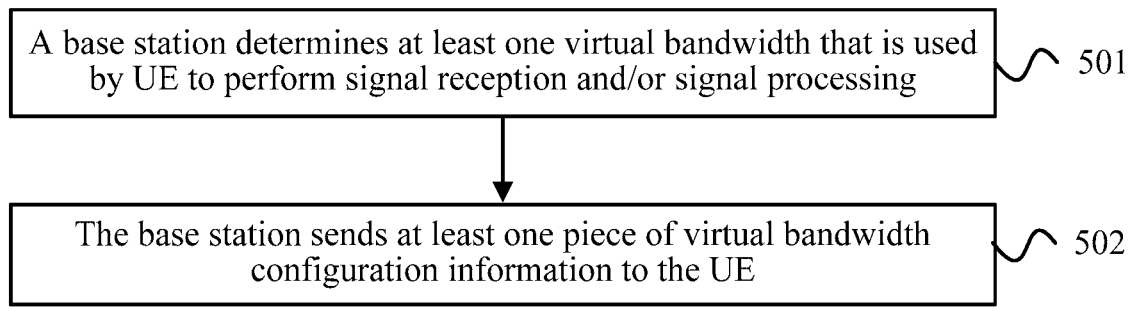
FIG. 5 is a schematic flowchart of a bandwidth configuration method provided in Embodiment 8 of the present invention.

FIG. 5 is a schematic flowchart of a bandwidth configuration method provided in Embodiment 8 of the present invention. As shown in FIG. 5, this embodiment is performed by a bandwidth configuration apparatus configured in a base station. The method includes:

Step 501. The base station determines at least one virtual bandwidth that is used by UE to perform signal reception and/or signal processing.

Step 502. The base station sends at least one piece of virtual bandwidth configuration information to the UE.

Specifically, the at least one piece of virtual bandwidth configuration information is used for instructing the UE to perform signal reception and/or signal processing according to at least one virtual bandwidth in the virtual bandwidth indicated by the at least one piece of virtual bandwidth configuration information, where each virtual bandwidth is a part or all of a downlink maximum available bandwidth or a downlink transmission bandwidth, and the downlink maximum available bandwidth is a maximum bandwidth available for downlink transmission. The downlink transmission bandwidth includes a downlink system bandwidth configured by the base station by using a master information block (MIB for short). Specifically, a virtual bandwidth indicated by each piece of virtual bandwidth configuration information may be independent, and attribute information, such as a size, position information, a type, and downlink transmit power information of each virtual bandwidth may be independently configured, and is not related to another virtual bandwidth. Alternatively, for multiple virtual bandwidths, at least one piece of attribute information, such as a size, position information, a type, and downlink transmit power information of a corresponding virtual bandwidth is jointly configured or predefined.

In this embodiment of the present invention, at least one piece of independent virtual bandwidth configuration information is configured, and signal reception and/or signal processing no longer needs to be performed according to a fixed bandwidth, so that overheads and complexity of signal reception and signal processing are reduced, and overheads and complexity of signal reception and processing feedback can be controlled flexibly.

Optionally, the at least one piece of virtual bandwidth configuration information includes virtual bandwidth configuration information corresponding to different subframe sets, that is, for each subframe set, virtual bandwidth configuration information may be configured independently, so that the virtual bandwidth configuration information indicates a virtual bandwidth on the subframe set.

Optionally, the "at least one" may be "at least two". The virtual bandwidth configuration information is used for indicating a configuration of a virtual bandwidth. The virtual bandwidth configuration information and the virtual bandwidth are in a one-to-one relationship, that is, one piece of virtual bandwidth configuration information indicates a configuration of one virtual bandwidth. Correspondingly, Receiving, by the UE, virtual bandwidth configuration information includes:

a. receiving, by the UE, virtual bandwidth configuration information, and then performing, by the UE, various types of signal reception and signal processing on a virtual bandwidth; and b. receiving, by the UE, virtual bandwidth configuration information corresponding to a signal or a channel or signal processing, and then performing, by the UE, signal reception or reception of a corresponding channel signal or signal processing according to the virtual bandwidth configuration information of the signal.

Specifically, the virtual bandwidth configuration information may be carried in physical layer signaling and/or higher layer signaling, and each piece of virtual bandwidth configuration information is configured independently. For example, the virtual bandwidth configuration information is carried by using only physical layer signaling or by using only higher layer signaling, or multiple pieces of candidate virtual bandwidth configuration information are carried by using higher layer signaling, and one of the multiple pieces of candidate virtual bandwidth configuration information is configured, by using physical layer signaling, as virtual bandwidth configuration information in actual use.

Embodiment 9

Figure 6:
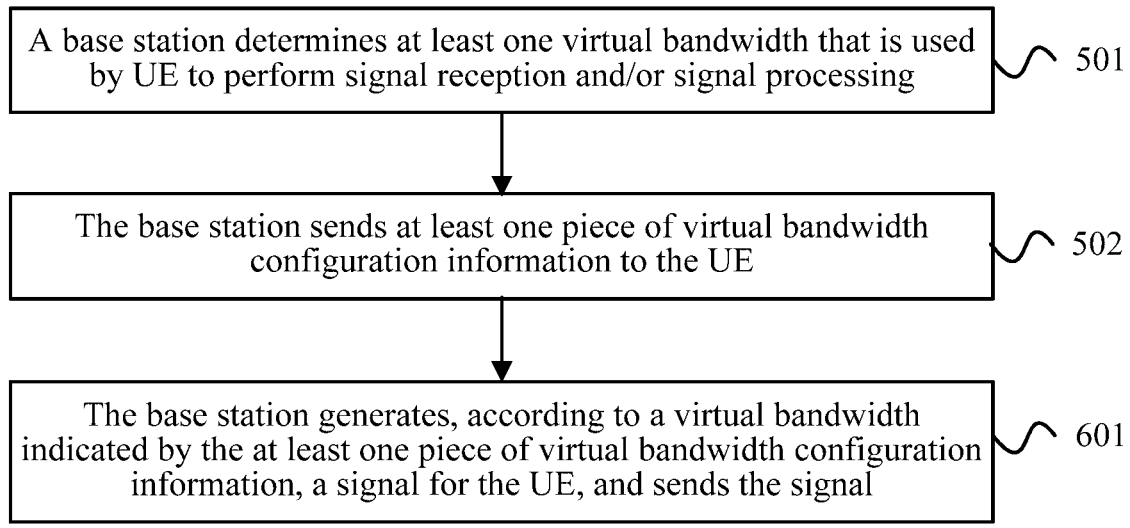
FIG. 6 is a schematic flowchart of a bandwidth configuration method provided in Embodiment 9 of the present invention.

FIG. 6 is a schematic flowchart of a bandwidth configuration method provided in Embodiment 9 of the present invention. As shown in FIG. 6, the bandwidth configuration method may further include the following step:

Step 601. The base station generates, according to a virtual bandwidth indicated by the at least one piece of virtual bandwidth configuration information, a signal for the UE, and sends the signal.

Specifically, a sequence of the signal may be generated according to the virtual bandwidth and based on a preset formula, or may be generated according to the downlink maximum available bandwidth or the downlink transmission bandwidth and based on a preset formula and may be truncated according to a position of the virtual bandwidth in the downlink maximum available bandwidth or the downlink transmission bandwidth, so that the base station may flexibly configure a transmission bandwidth for a signal and bandwidths for measurement and feedback required by the UE, and signal reception and/or signal processing no longer needs to be performed according to a fixed bandwidth, thereby reducing overheads of a reference signal and complexity of measurement and feedback.

Embodiment 10

Figure 7:
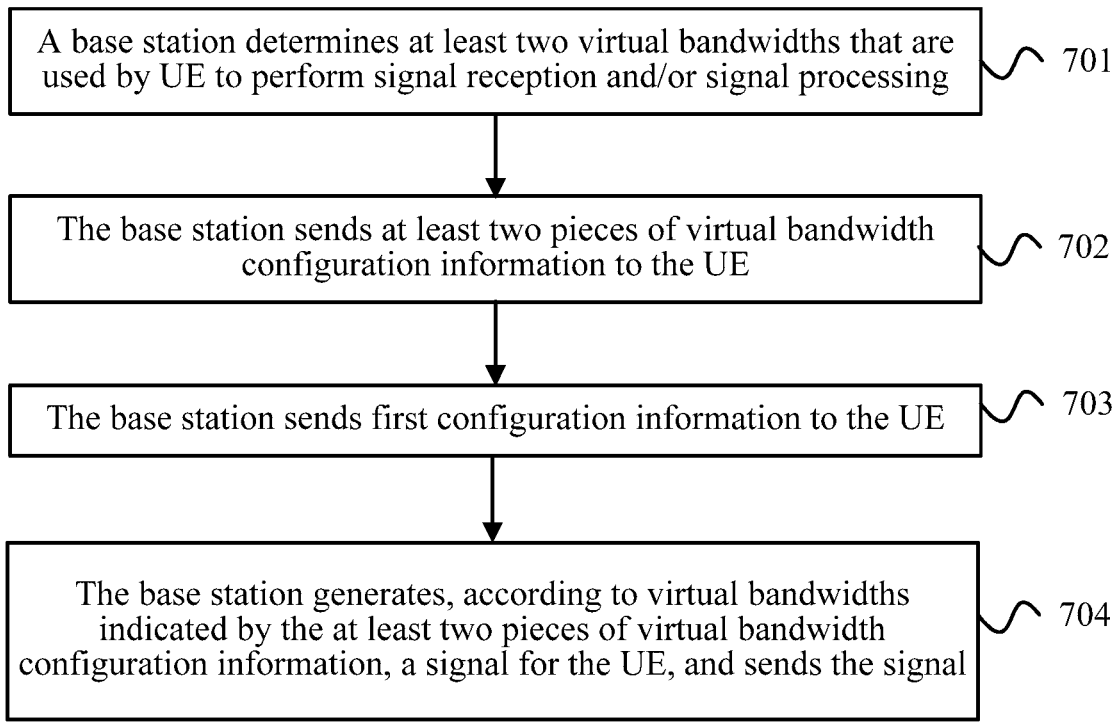
FIG. 7 is a schematic flowchart of a bandwidth configuration method provided in Embodiment 10 of the present invention.

In the foregoing embodiment, in step 502, the base station sends at least one piece of virtual bandwidth configuration information to the UE. The "at least one" includes "at least two". When the UE receives at least two pieces of virtual bandwidth configuration information, as shown in FIG. 7, the method may include:

Step 701. The base station determines at least two virtual bandwidths that is used by the UE to perform signal reception and/or signal processing.

Step 702. The base station sends at least two pieces of virtual bandwidth configuration information to the UE.

Optionally, the following steps may be included:

Step 703. The base station sends first configuration information to the UE.

Specifically, the first configuration information is used for instructing the UE to perform signal reception or signal processing according to a virtual bandwidth corresponding to at least one piece of virtual bandwidth configuration information in the at least two pieces of virtual bandwidth configuration information.

Step 704. The base station generates, according to virtual bandwidths indicated by the at least two pieces of virtual bandwidth configuration information, a signal for the UE and sends the signal.

Step 703 and step 704 are optional. After step 702 is performed, step 703 and step 704 may be performed, or step 704 may be directly performed, which is not limited herein.

According to this embodiment, a base station may configure that UE performs signal reception or signal processing on different virtual bandwidths according to different first configuration information, and the UE does not need to perform signal reception or signal processing on an entire downlink transmission bandwidth or downlink maximum available bandwidth by using same first configuration information, so that higher flexibility can be achieved and complexity of processing of the UE can be reduced.

Embodiment 11

Figure 8:
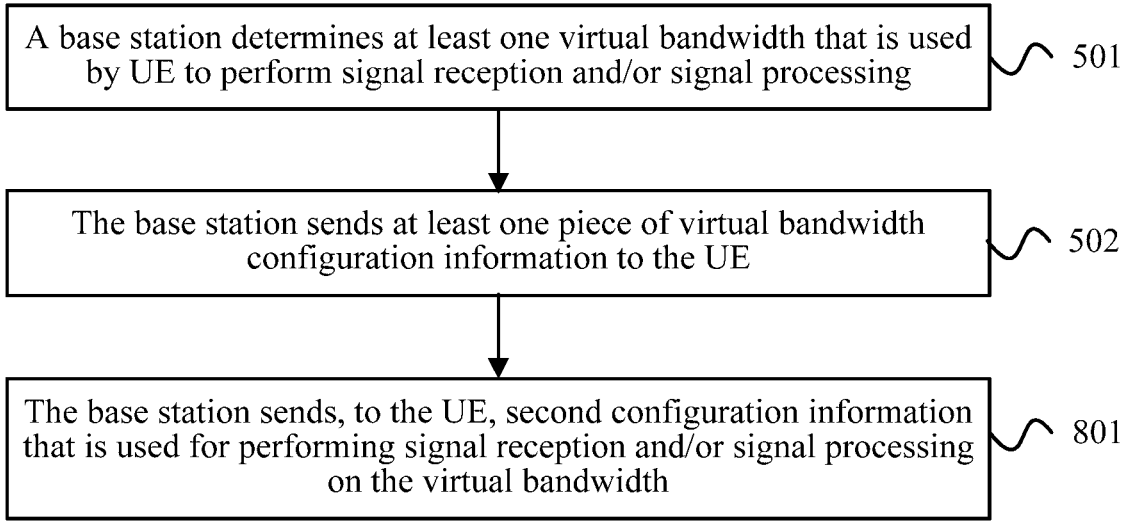
FIG. 8 is a schematic flowchart of a bandwidth configuration method provided in Embodiment 11 of the present invention.

In Embodiment 11 of the present invention, optimization is made on the basis of the foregoing embodiment, and as shown in FIG. 8, the method may further include:

Step 801. The base station sends, to the UE, second configuration information that is used for performing signal reception and/or signal processing on the virtual bandwidth.

The second configuration information is configuration information of the signal or signal processing, and may be configured independently from the virtual bandwidth configuration information, or may be predefined, and sent to the UE by using the base station. In addition, the second configuration information may be configuration information of a parameter such as information about a scrambling code, port information, a time domain parameter, and a frequency domain parameter of the signal, or may be configuration information of signal processing such as channel estimation, signal detection, and data demodulation, which is not limited herein.

Optionally, in all the embodiments of the present invention, the virtual bandwidth configuration information may be used for instructing the UE to perform at least one type of signal reception or signal processing on each virtual bandwidth in the virtual bandwidth corresponding to the at least one piece of virtual bandwidth configuration information.

Further, in all the embodiments of the present invention, the signal reception and/or signal processing includes at least one of the following signal reception or signal processing: CSI-RS reception, CRS reception, PDCCH search, EPDCCH search, CSI measurement, RRM measurement, CSI feedback, PDSCH reception, PHICH reception, EPHICH reception, PMCH reception, and common signal reception, where the common signal reception includes at least one of the following: PBCH reception, ePBCH reception, PSS/SSS reception, and discovery signal reception. Therefore, for any type of signal reception or signal processing described above, the UE may perform reception or processing according to the virtual bandwidth, and the UE may perform different signal reception or signal processing according to different virtual bandwidths, where the different signal reception or signal processing includes different channel reception or channel processing.

Further, in all the embodiments of the present invention, the virtual bandwidth configuration information includes at least one piece of information of a size, position information, a type, and downlink transmit power information of the virtual bandwidth, and the at least one information is separately described below:

a. The position information of the virtual bandwidth includes starting position information of the virtual bandwidth or central frequency information of the virtual bandwidth. A starting position of the virtual bandwidth is preferably a starting position of any one resource block group in resource block groups (RBG for short) obtained by dividing according to a downlink maximum available bandwidth or a downlink transmission bandwidth. In this embodiment of the present invention, an entire resource block group may be included in a virtual bandwidth.

Optionally, the central frequency information of the virtual bandwidth is any position in the downlink maximum available bandwidth or the downlink transmission bandwidth. Preferably, the downlink maximum available bandwidth or the downlink transmission bandwidth is divided into N average parts, and the central frequency information of the virtual bandwidth is a central frequency of one part thereof. For example, the central frequency information of the virtual bandwidth is a central frequency of the entire downlink maximum available bandwidth or downlink transmission bandwidth, or the downlink maximum available bandwidth or the downlink transmission bandwidth is divided into 2 average parts, and the central frequency of the virtual bandwidth is a central frequency of the first part or the second part.

Preferably, a position of the central frequency of the virtual bandwidth position may be a position of a subcarrier, meeting that a frequency of the subcarrier is a positive number multiple of 100 KHz, in the downlink maximum available bandwidth or the downlink transmission bandwidth.

When virtual bandwidths of two CSI-RSs overlap, REs that may be corresponding to the two CSI-RSs may overlap in an overlapped region, or the two CSI-RSs may share some REs in an overlapped region, or in an overlapped region, when REs corresponding to the two CSI-RSs overlap, a CSI-RS with a lower priority is not sent. A priority of a CSI-RS is predefined, or a priority of a CSI-RS is implicitly notified, for example, a CSI-RS with a low index number has a high priority, or a priority of a CSI-RS is explicitly notified, for example, a base station notifies UE of a priority of each CSI-RS.

Moreover, starting position information of the virtual bandwidth may also be any position in the downlink maximum available bandwidth or the downlink transmission bandwidth. The downlink transmission bandwidth may be a downlink system bandwidth of a serving cell.

b. The size of the virtual bandwidth, preferably, equals a sum of sizes of at least one resource block group in resource block groups obtained by dividing according to the downlink maximum available bandwidth or the downlink transmission bandwidth; or the size of the virtual bandwidth is predefined. For example, the size of the virtual bandwidth is one of standard downlink transmission bandwidths, for example, 1.4/3/5/10/15/20 megahertz (MHz for short), or 6/15/25/50/75/100 physical resource blocks (PRB for short). In addition, the size of the virtual bandwidth may also be smaller than or equal to any size of the downlink maximum available bandwidth or the downlink transmission bandwidth, and is not limited herein. In this embodiment of the present invention, an entire resource block group may be included in a virtual bandwidth.

c. The downlink transmit power information includes transmit power of a CRS or an RCRS. The downlink transmit power information corresponding to the virtual bandwidth may be the same as or different from downlink transmit power information on the downlink maximum available bandwidth or the downlink transmission bandwidth. For example, the downlink transmit power information on the downlink maximum available bandwidth or the downlink transmission bandwidth is 46 dBm, while the downlink transmit power information corresponding to the virtual bandwidth may be 46 dBm, or 40 dBm, or 23 dBm. The downlink transmit power information may be transmit power information of a downlink reference signal, for example, CRS transmit power or CSI-RS transmit power. In this embodiment of the present invention, downlink transmit power on different bandwidths may be set more flexibly.

d. The type of the virtual bandwidth is at least one of a centralized virtual bandwidth, a discontinuous virtual bandwidth, and a distributed virtual bandwidth. If the type of the virtual bandwidth is a discontinuous virtual bandwidth, a quantity of discontinuous bandwidths included in the virtual bandwidth is predefined. For example, at most 2 discontinuous bandwidth parts may be included, and in this case, the size and position information of the virtual bandwidth include a size and position information of each discontinuous bandwidth. If the type of the virtual bandwidth is a distributed virtual bandwidth, a distance between distributed virtual bandwidth components and a size of each virtual bandwidth component are predefined or configured by a base station for UE. The type of the virtual bandwidth may be continuous or discontinuous. For example, the downlink transmission bandwidth is 10 MHz, and the virtual bandwidth may be a continuous bandwidth of 5 MHz, or may be formed by two discontinuous bandwidths of 2.5 MHz, as shown in FIG. 10. The virtual bandwidth may be centralized or distributed. For example, the virtual bandwidth may be centralized continuous 5 MHz, or may be distributed, for example, the virtual bandwidth is a bandwidth of which a starting position is a starting physical resource block (PRB for short) of a first resource block group obtained by means of distributed mapping of a downlink transmission bandwidth, and a bandwidth size is the first and second resource block groups, or as shown in FIG. 11. The virtual bandwidth configuration information may further include information about a manner of mapping from a VRB (virtual resource block) to a PRB.

Further, when the base station sends two or more pieces of virtual bandwidth configuration information to the UE, at least one of position information, sizes, types, and downlink transmit power information corresponding to virtual bandwidths indicated by any two pieces of virtual bandwidth configuration information in the two or more pieces of virtual bandwidth configuration information is different. When the virtual bandwidth configuration information is used for indicating a virtual bandwidth corresponding to at least one type of signal reception or signal processing, position information, a size, a type, and downlink transmit power information of virtual bandwidths corresponding to different signal reception or signal processing may be configured independently or configured jointly. The virtual bandwidths corresponding to different signal reception or signal processing may also be the same, which is not limited herein.

Optionally, in all the embodiments of the present invention, the sending, by the base station, at least one piece of virtual bandwidth configuration information to the UE includes: sending, by the base station to the UE, the at least one piece of virtual bandwidth configuration information carried in broadcast message signaling or multicast signaling or UE specific signaling. The broadcast message signaling or multicast signaling or UE specific signaling may specifically be physical layer signaling and/or higher layer signaling, and may be carried only by using the physical layer signaling, or carried only by using the higher layer signaling, or multiple pieces of candidate virtual bandwidth configuration information are carried by using the higher layer signaling, and one of the multiple pieces of candidate virtual bandwidth configuration information is configured, by using the physical layer signaling, as virtual bandwidth configuration information in actual use.

When the at least one piece of virtual bandwidth configuration information is carried in the broadcast signaling, the broadcast signaling is at least one of a MIB and a system information block type 2 (SIB2 for short). When the at least one piece of virtual bandwidth configuration information is carried in the multicast signaling, the multicast signaling includes at least one of multimedia broadcast multicast service (MBMS for short) control signaling and multicast signaling that is sent by a primary cell to the UE and is used for indicating configuration information of a secondary cell. When the at least one piece of virtual bandwidth configuration information is carried in the UE specific signaling, the UE specific signaling includes at least one of UE specific Radio Resource Control (RRC for short) signaling and UE specific signaling that is sent by a primary cell to the UE and is used for indicating configuration information of a secondary cell.

Optionally, in all the embodiments of the present invention, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a physical common control channel. The common signal and/or common channel may be transmitted on all virtual bandwidths or transmitted on only some virtual bandwidths, for example, transmitted only on one virtual bandwidth. When the common signal and/or common channel is transmitted on multiple virtual bandwidths, common signals and/or common channels transmitted on different virtual bandwidths may have a same configuration or parameter or different configurations or parameters. In this embodiment of the present invention, it may be flexibly configured that UE detects or receives a common signal and/or a common channel on a virtual bandwidth.

Embodiment 12

Embodiment 12 of the present invention provides a bandwidth configuration method, which is a specific application scenario based on the foregoing embodiment, and is specifically used for configuring a virtual bandwidth for a CSI-RS.

In this embodiment, the at least one piece of virtual bandwidth configuration information is virtual bandwidth configuration information corresponding to each CSI-RS in at least one CSI-RS, so that the UE receives a corresponding CSI-RS according to at least one virtual bandwidth in the virtual bandwidth indicated by the at least one piece of virtual bandwidth configuration information, where the CSI-RS is an NZP CSI-RS or a ZP CSI-RS. When there are at least two CSI-RSs that are configured by the base station and received by the UE, one virtual bandwidth may separately be configured for each CSI-RS, and virtual bandwidths of different CSI-RSs may be configured independently or configured jointly.

Further, when the CSI-RS is an NZP CSI-RS, there are the following implementation manners for a sequence of the NZP CSI-RS:

Manner 1: The sequence of the NZP CSI-RS is generated based on a preset formula and according to a virtual bandwidth corresponding to the NZP CSI-RS.

Manner 2: The sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula.

Manner 3: The sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

Preset formulae based on which the sequence of the NZP CSI-RS is generated are Formulae (1) and (2), and symbols in Formulae (1) and (2) are described above, and are not repeatedly described herein.

Further, when the CSI-RS is an NZP CSI-RS, the bandwidth configuration method may further include: sending, by the base station to the UE, transmit power information corresponding to the NZP CSI-RS on a virtual bandwidth corresponding to the virtual bandwidth configuration information, where transmit power information corresponding to different NZP CSI-RSs may be independent, and the transmit power information may be included in the virtual bandwidth configuration information, or may be transmit power information independent from the virtual bandwidth configuration information. In this case, when the NZP CSI-RS is transmitted by the base station to the UE, corresponding transmit power information is only used on a virtual bandwidth corresponding to the NZP CSI-RS to perform transmission. For example, transmit power corresponding to one NZP CSI-RS is A dBm, and transmit power corresponding to another NZP CSI-RS is B dBm, where A and B may be completely independent.

Specifically, based on the foregoing embodiment, preferably, the base station receives a result that is obtained by performing RRM measurement according to a virtual bandwidth of the CSI-RS and that is reported by the UE, where the result includes at least one of RSRP, RSRQ, and an RSSI.

In this embodiment, a virtual bandwidth is configured for each CSI-RS by using at least one piece of virtual bandwidth configuration information, so that the different CSI-RSs correspond to the different virtual bandwidths, and these virtual bandwidths are independent of each other; therefore, it is implemented that the CSI-RSs may be transmitted on different virtual bandwidths, and it is not required that all CSI-RSs must be transmitted on an entire downlink transmission bandwidth or maximum downlink available bandwidth, so that overheads of a reference signal are reduced; for generation of a CSI-RS sequence, it is also not required to generate a CSI-RS sequence having a fixed length according to an entire downlink transmission bandwidth or downlink maximum available bandwidth, and instead generation may be performed according to the configured virtual bandwidth; in addition, signal processing such as RRM measurement also only needs to be performed on a corresponding virtual bandwidth, so that complexity of measurement and feedback is reduced.

Embodiment 13

Embodiment 13 of the present invention provides a bandwidth configuration method, which is another specific application scenario based on the foregoing embodiment, and is specifically used for configuring a virtual bandwidth for a CSI-IM.

In this embodiment, the sending, by the base station, at least one piece of virtual bandwidth configuration information to the UE includes: sending, by the base station to the UE, virtual bandwidth configuration information corresponding to each CSI-IM in at least one CSI-IM.

When the base station configures a CSI-IM for the UE, each CSI-IM may be corresponding to one piece of virtual bandwidth configuration information, and virtual bandwidth configuration information corresponding to different CSI-IMs may be independent. These CSI-IMs may be used for different CoMP transmission assumption.

When there are at least two CSI-IMs, virtual bandwidths of any two CSI-IMs may overlap. When virtual bandwidths of two CSI-IMs overlap, REs corresponding to the two CSI-IMs may overlap in an overlapped region, or the two CSI-IMs may share some REs.

In this embodiment, each CSI-IM corresponds to independent virtual bandwidth configuration information, so that during interference coordination between cells, each cell uses a respective corresponding virtual bandwidth of the cell, so that UE does not need to perform measurement of interference or channel state information according to an entire downlink transmission bandwidth or downlink maximum available bandwidth, and instead, may perform measurement of interference or channel state information according to different virtual bandwidths; moreover, a result of broadband measurement of the UE can accurately reflect an actual channel state, and actual overheads of measurement and feedback of the UE are close to actually required overheads, thereby further reducing complexity of the UE and improving accuracy of measurement.

Embodiment 14

Embodiment 14 of the present invention provides a bandwidth configuration method, which is still another specific application scenario based on the foregoing embodiment, and is specifically used for configuring a virtual bandwidth for a CSI-Process. Each CSI process corresponds to a combination of one NZP CSI-RS and one CSI-IM, and UE measures a channel on the NZP CSI-RS and performs interference measurement on the CSI-IM, and then calculates, according to the measured channel and interference obtained by means of measurement, CSI information corresponding to a corresponding CSI process.

In this embodiment, the sending, by the base station, at least one piece of virtual bandwidth configuration information to the UE includes: sending, by the base station to the UE, virtual bandwidth configuration information corresponding to each CSI process in at least one channel state information process CSI process, so that the UE performs measurement or measurement feedback of the CSI according to the virtual bandwidth configuration information corresponding to each CSI process. The "at least one" includes "at least two", that is, the at least one piece of virtual bandwidth configuration information may be virtual bandwidth configuration information corresponding to each CSI process in the at least two CSI processes; in this case, a virtual bandwidth corresponding to each CSI process in the at least two CSI processes may be configured independently.

Optionally, a starting position of the virtual bandwidth is a starting position of any one subband in subbands obtained by dividing according to a downlink maximum available bandwidth or a downlink transmission bandwidth; and/or the size of the virtual bandwidth equals a sum of sizes of at least one subband in the subbands obtained by dividing according to the downlink maximum available bandwidth or the downlink transmission bandwidth. That is, a starting position and a size of the virtual bandwidth may be met at the same time, or only one of a starting position and a size may be met, which is not limited herein.

Optionally, a virtual bandwidth corresponding to the CSI process is covered within a range of a virtual bandwidth of an NZP CSI-RS and/or a CSI-IM corresponding to the CSI process, or the virtual bandwidth configuration information corresponding to the CSI process is virtual bandwidth configuration information of an NZP CSI-RS and/or a CSI-IM corresponding to the CSI process.

Optionally, the base station determines, according to the virtual bandwidth corresponding to the CSI process or downlink maximum available bandwidth or the downlink transmission bandwidth, at least one of a size of a subband and a size of a subband set that are of the CSI process, then determines, according to the size of the subband, a quantity of subbands corresponding to the CSI process, and/or determines, according to the size of the subband set, a quantity of subband sets corresponding to the CSI process. When the size of the subband corresponding to the CSI process is determined according to the virtual bandwidth of the CSI process, the size of the subband of the CSI process may be any value, or may be notified by the base station to the UE or predefined. When the size of the subband set corresponding to the CSI process is determined according to the virtual bandwidth of the CSI process, the size of the subband set of the CSI process may be any value, or may be notified by the base station to the UE or predefined. Alternatively, the base station determines, according to the virtual bandwidth corresponding to the CSI process, at least one of a quantity of subbands and a quantity of subband sets that are of the CSI process, and then determines the size of the subband according to the quantity of the subbands corresponding to the CSI process, and/or determines the size of the subband sets according to the quantity of the subband sets corresponding to the CSI process. When the quantity of the subbands corresponding to the CSI process is determined according to the virtual bandwidth of the CSI process, the quantity of the subband of the CSI process may be any value, or may be notified by the base station to the UE or predefined. When the quantity of the subband sets corresponding to the CSI process is determined according to the virtual bandwidth of the CSI process, the quantity of the subband sets of the CSI process may be any value, or may be notified by the base station to the UE or predefined. Optionally, when the UE receives virtual bandwidth configuration information of at least two CSI processes, sizes of subbands of the at least two CSI processes are independent.

Optionally, the base station receives broadband channel state information CSI, where the CSI is corresponding to the CSI process, obtained by means of measurement according to the virtual bandwidth corresponding to the CSI process, and reported by the UE.

In this embodiment, a base station configures, for different CSI-Processes, virtual bandwidth configuration information required for a relatively independent virtual bandwidth, so that UE performs, according to a CSI-IM corresponding to a CSI process configured by the base station, interference measurement on a virtual bandwidth, and performs, according to an NZP CSI-RS corresponding to a CSI process configured by a base station, channel measurement on a virtual bandwidth. Measurement and feedback of CSI are not performed on an entire downlink maximum available bandwidth or downlink transmission bandwidth, instead, measurement and feedback of the CSI are performed on different virtual bandwidths, so that complexity of the UE can be reduced, and flexibility of measurement and feedback and data reception of the UE is improved.

Embodiment 15

Embodiment 15 of the present invention provides a bandwidth configuration method, which is yet another specific application scenario based on the foregoing embodiment, and is specifically used for configuring a virtual bandwidth for resource allocation.

In this embodiment, the sending, by the base station, at least one piece of virtual bandwidth configuration information to the UE includes: sending, by the base station, the virtual bandwidth configuration information to the UE, where the virtual bandwidth configuration information is used for indicating a corresponding virtual bandwidth used for performing resource allocation for the UE, and there is at least one corresponding virtual bandwidth used for performing resource allocation for the UE. After a corresponding virtual bandwidth used for performing resource allocation for the UE is configured for the UE, and during resource allocation for the UE, only a resource on a corresponding virtual bandwidth is allocated to the UE.

Optionally, the corresponding virtual bandwidth used for performing resource allocation for the UE and a virtual bandwidth corresponding to the CSI process are independently configured. A resource included to perform resource allocation once for the UE is a resource on at least one virtual bandwidth. That is, when one virtual bandwidth used for resource allocation is configured for the UE, only a resource on the virtual bandwidth is allocated to the UE. When two or more virtual bandwidths used for resource allocation are configured for the UE, a resource allocated to the UE may be any resource or a combination of any resources on the two or more virtual bandwidths used for resource allocation.

Optionally, a resource included to perform resource allocation once for the UE is a resource on at least one virtual bandwidth. When a bandwidth corresponding to one time of resource allocation includes at least two virtual bandwidths, a size of a resource block group and a quantity of resource block groups that are corresponding to the current resource allocation are separately determined according to each virtual bandwidth in the at least two virtual bandwidths or are determined according to a sum of sizes of the at least two virtual bandwidths or are determined according to a downlink transmission bandwidth or a downlink maximum available bandwidth. A quantity of RBs corresponding to each resource block group may be different. For example, a bandwidth corresponding to one time of resource allocation includes two virtual bandwidths that do not overlap, where a first virtual bandwidth includes 2 resource block groups, and each resource block group has a size of 3 RBs, while a second virtual bandwidth includes 2 resource block groups, and each resource block group has a size of 6 RBs. Therefore, when a resource block group of the current resource allocation is separately determined according to each virtual bandwidth, the current resource allocation has 4 resource block groups in total.

Figure 9:
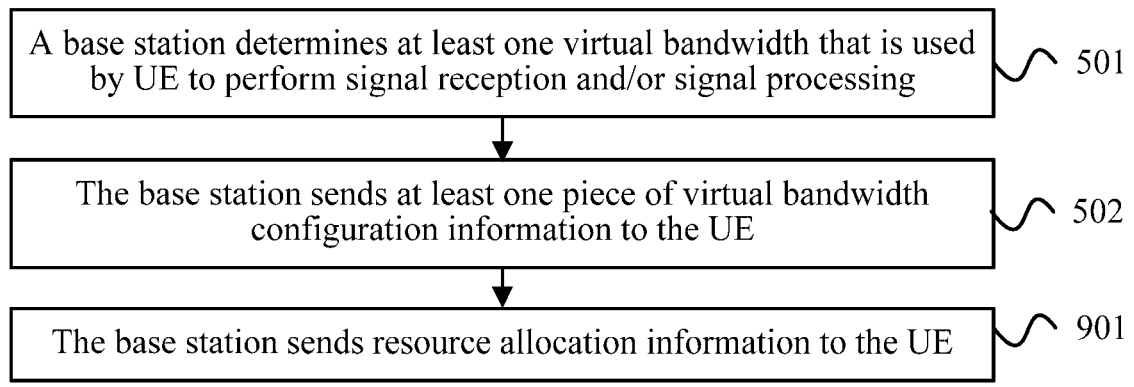
FIG. 9 is a schematic flowchart of a bandwidth configuration method provided in Embodiment 15 of the present invention.

Further, as shown in FIG. 9, after the base station sends at least one piece of virtual bandwidth configuration information to the UE, the method may further include:

Step 901. The base station sends resource allocation information to the UE.

The resource allocation information includes the index information of at least one virtual bandwidth corresponding to the resource. The "at least one" includes "at least two". Specifically, the UE receives DCI. The DCI is carried in a PDCCH or an ePDCCH, and the DCI includes resource allocation information. The resource allocation information is configured according to the virtual bandwidth. For example, a quantity of PRBs corresponding to the virtual bandwidth is used as a maximum available quantity $N_{RB}^{VDL}$ of PRBs for resource allocation. The UE receives, according to the resource allocation, a channel indicated by the DCI such as a PDSCH on the virtual bandwidth.

Optionally, a length of the resource allocation information is determined by a size of the virtual bandwidth. Specifically, during resource allocation for the UE, the base station determines, according to a size of at least one virtual bandwidth used for performing current resource allocation for the UE, a length of the resource allocation information, while when receiving the resource allocation information, the UE also determines, according to the size of the at least one virtual bandwidth used for performing the current resource allocation for the UE, the length of the resource allocation information. For example, the downlink transmission bandwidth is 20 MHz, and the size of the virtual bandwidth used for resource allocation is 5 MHz, so that the length of the resource allocation information used for indicating resource allocation on the virtual bandwidth is determined according to the size of the virtual bandwidth. For example, there are M resource block groups on the virtual bandwidth, where M is a positive integer greater than zero, and therefore the length of the resource allocation information may be M bits. Actually, the method for determining a length of resource allocation information according to a virtual bandwidth is not limited thereto. The at least one virtual bandwidth used for performing the current resource allocation for the UE may be notified by the base station to the UE in a semistatic manner, or may be obtained by the UE by means of blind detection, or may be obtained by the UE by means of detection of the index information of at least one virtual bandwidth used for performing the current resource allocation for the UE.

Optionally, a type of the virtual bandwidth used for performing resource allocation for the UE is independent of a type of resource allocation. For example, the virtual bandwidth is centralized virtual bandwidth, while the resource allocation may be centralized or distributed resource allocation.

Optionally, in all the embodiments, when the base station sends at least two pieces of virtual bandwidth configuration information to the UE, the method further includes: sending, by the base station, scheduling information of inter-virtual bandwidth to the UE, where the scheduling information includes index information that is used for indicating a virtual bandwidth corresponding to the scheduling information and that is sent by the base station to the UE, so as to determine the virtual bandwidth corresponding to the time of resource allocation. For example, a CIF is reused or a new bit is used to indicate a virtual bandwidth corresponding to scheduling information. Optionally, after a quantity of resource block groups corresponding to one time of resource allocation is determined, a length of index information corresponding to the resource allocation is determined according to a corresponding quantity of resource block groups.

In this embodiment, a base station configures at least one piece of virtual bandwidth configuration information for UE, and performs resource allocation for the UE by using a virtual bandwidth indicated by the at least one piece of virtual bandwidth configuration information, and resource allocation is no longer performed only according to a downlink transmission bandwidth or a downlink maximum available bandwidth, so that signaling overheads of resource allocation can be reduced. Moreover, resource scheduling during which sizes of resource blocks are more flexible can be performed for the UE.

Optionally, in all the embodiments, in a scenario, the bandwidth configuration method may further include: sending, by the base station to the UE, third configuration information of rate matching and quasi co-location assumption corresponding to the virtual bandwidth. The third configuration information may be set in the virtual bandwidth configuration information, or may be otherwise configured independently.

Specifically, for a virtual bandwidth used for each time of resource allocation, the base station configures, by using physical layer signaling and/or higher layer signaling, at least one piece of third configuration information of rate matching and quasi co-location assumption for the UE. The third configuration information of rate matching and quasi co-location assumption corresponding to each virtual bandwidth is configured independently. For example, both quantities of third configuration information of rate matching and quasi co-location assumption and specific configuration information may be independent. For example, for the UE, the base station configures 4 pieces of third configuration information of rate matching and quasi co-location assumption for one virtual bandwidth, and configures 2 pieces of third configuration information of rate matching and quasi co-location assumption for the other virtual bandwidth, where the third configuration information of rate matching and quasi co-location assumption for the two virtual bandwidths are independent.

When one virtual bandwidth includes at least two discontinuous bandwidth parts, the base station may configure, for the UE, third configuration information of rate matching and quasi co-location assumption for each bandwidth part. The third configuration information of rate matching and quasi co-location assumption corresponding to each virtual bandwidth part may be configured independently.

Optionally, in all the embodiments, in still another scenario, the bandwidth configuration method may further include: sending, by the base station to the UE, fourth configuration information of quasi co-location assumption corresponding to the virtual bandwidth, where the fourth configuration information may be set in the virtual bandwidth configuration information, or may be otherwise configured independently. The fourth configuration information includes at least one of the following information: a quantity of ports of a CRS, position information of a subframe of a CRS, position information of a first symbol of a PDSCH, MBSFN configuration information in the virtual bandwidth, and ZP CSI-RS configuration information in the virtual bandwidth.

Optionally, in all the embodiments, in still another scenario, the bandwidth configuration method may further include: sending, by the base station to the UE, fifth configuration information of quasi co-location assumption corresponding to the virtual bandwidth, where the fifth configuration information may be set in the virtual bandwidth configuration information, or may be otherwise configured independently. The fifth configuration information includes at least one of the following information: configuration information of a CSI-RS that is quasi co-located with a DM RS and configuration information of a CRS that is quasi co-located with a CSI-RS.

Further, based on the foregoing embodiment, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

In this embodiment of the present invention, a base station may configure, for UE, information about rate matching and/or quasi co-location assumption corresponding to each virtual bandwidth, so that different virtual bandwidths may have different rate matching and/or quasi co-location assumption, and the UE and the base station reach consistent understanding of rate matching and/or quasi co-location assumption on each different node and bandwidth; moreover, configuration of rate matching and/or quasi co-location assumption may be very flexible, so that a limitation that a same configuration is required to be used at all positions on a downlink transmission bandwidth is overcome, thereby reducing overheads of transmission and increasing flexibility.

Optionally, the bandwidth configuration method may further include: sending, by the base station, sixth configuration information to the UE, where the sixth configuration information is used for indicating a transmission resource of a PUCCH acknowledgement signal/negative-acknowledgement signal ACK/NACK corresponding to the virtual bandwidth. The sixth configuration information may be a parameter $N_{PUCCH}^{(1)}$ used for indicating a transmission resource of PUCCH ACK/NACK corresponding to the virtual bandwidth and/or a HARQ-ACK resource offset. The UE determines the transmission resource of the PUCCH ACK/NACK corresponding to the virtual bandwidth according to the sixth configuration information. A resource used for transmitting the PUCCH ACK/NACK corresponding to the virtual bandwidth is configured for different virtual bandwidths, so that a limitation that only one resource used for transmitting PUCCH ACK/NACK can be configured on a downlink transmission bandwidth or downlink maximum available bandwidth can be overcome, and a flexibility of configuring a resource used for transmitting PUCCH ACK/NACK corresponding to each virtual bandwidth in a case of configuring a virtual bandwidth can be increased, thereby reducing a probability of collision between transmission resources corresponding to different ACK/NACK.

Embodiment 16

Figure 12:
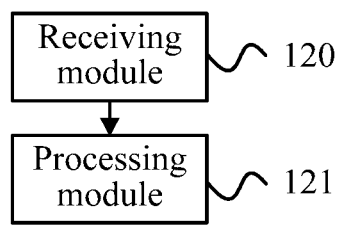
FIG. 12 is a schematic structural diagram of a bandwidth configuration apparatus provided in Embodiment 16 of the present invention.

FIG. 12 is a schematic structural diagram of a bandwidth configuration apparatus provided in Embodiment 16 of the present invention. For the apparatus in this embodiment, the apparatus may be configured in user equipment, and may be configured to perform the technical solution of the bandwidth configuration method, performed on a UE side, provided in the embodiments of the present invention. As shown in FIG. 12, the apparatus in this embodiment specifically includes: a receiving module 120 and a processing module 121. Specifically, the receiving module 120 is configured to receive at least one piece of virtual bandwidth configuration information, where the virtual bandwidth configuration information is used for indicating a configuration of a virtual bandwidth; and the processing module 121 is configured to perform signal reception and/or signal processing according to at least one virtual bandwidth in the virtual bandwidth indicated by the at least one piece of virtual bandwidth configuration information, where each virtual bandwidth is a part or all of a downlink maximum available bandwidth or a downlink transmission bandwidth, and the downlink maximum available bandwidth is a maximum bandwidth available for downlink transmission.

The apparatus in this embodiment uses the foregoing modules to implement the technical solution of the bandwidth configuration method provided in the embodiments of the present invention, and has corresponding functional modules. Implementation principles and technical effects thereof are similar, and details are not repeatedly described herein. Corresponding functions of the functional modules in the apparatus in this embodiment of the present invention may be implemented by software, or may be implemented by hardware, or may be implemented in a manner of a combination of hardware and software.

Optionally, the processing module 121 is specifically configured to perform signal reception or signal processing on each virtual bandwidth in all virtual bandwidths corresponding to the at least one piece of virtual bandwidth configuration information.

Based on the foregoing embodiment, if the receiving module 120 is specifically configured to receive at least two pieces of virtual bandwidth configuration information, the receiving module 120 may further be configured to receive first configuration information, where the first configuration information is used for instructing the processing module 121 to perform signal reception or signal processing according to a virtual bandwidth corresponding to at least one piece of virtual bandwidth configuration information in the at least two pieces of virtual bandwidth configuration information. In this case, the processing module 121 is configured to perform signal reception and/or signal processing according to at least one virtual bandwidth in virtual bandwidths indicated by the at least two pieces of virtual bandwidth configuration information.

Optionally, the receiving module 120 may further be configured to receive second configuration information that is used for performing signal reception and/or signal processing on the virtual bandwidth, where the second configuration information is configuration information of the signal or signal processing.

Optionally, the virtual bandwidth configuration information is used for instructing the processing module 121 to perform at least one type of signal reception or signal processing on each virtual bandwidth in the virtual bandwidth corresponding to the at least one piece of virtual bandwidth configuration information.

Optionally, based on the foregoing, the signal reception and/or signal processing includes at least one of the following signal reception or signal processing: CSI-RS reception, CRS reception, PDCCH search, EPDCCH search, CSI measurement, measurement, CSI feedback, PDSCH reception, PHICH reception, EPHICH reception, PMCH reception, and common signal reception, where the common signal reception includes at least one of the following: PBCH reception, ePBCH reception, PSS/SSS reception, and discovery signal reception.

Optionally, the virtual bandwidth configuration information includes at least one piece of information of a size, position information, a type, and downlink transmit power information of the virtual bandwidth.

Optionally, the position information of the virtual bandwidth includes starting position information of the virtual bandwidth or central frequency information of the virtual bandwidth, where a starting position of the virtual bandwidth is a starting position of any one resource block group in resource block groups obtained by dividing according to the downlink maximum available bandwidth or the downlink transmission bandwidth.

Optionally, the size of the virtual bandwidth equals a sum of sizes of at least one resource block group in resource block groups obtained by dividing according to the downlink maximum available bandwidth or the downlink transmission bandwidth; or the size of the virtual bandwidth is predefined.

Optionally, the downlink transmit power information includes transmit power of a CRS or a reduced cell-specific reference signal RCRS.

Optionally, the type of the virtual bandwidth is at least one of a centralized virtual bandwidth, a discontinuous virtual bandwidth, and a distributed virtual bandwidth.

Further, when the receiving module 120 is specifically configured to receive at least two pieces of virtual bandwidth configuration information, at least one of position information, sizes, types, and downlink transmit power information corresponding to virtual bandwidths indicated by any two pieces of virtual bandwidth configuration information in the at least two pieces of virtual bandwidth configuration information is different.

Optionally, the receiving module 120 is specifically configured to receive the at least one piece of virtual bandwidth configuration information carried in broadcast message signaling or multicast signaling or user equipment UE specific signaling.

Optionally, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a common control channel.

Embodiment 17

This embodiment of the present invention provides a bandwidth configuration apparatus, which is specifically configured to configure a virtual bandwidth for a CSI-RS.

In this embodiment, the at least one piece of virtual bandwidth configuration information is virtual bandwidth configuration information corresponding to each CSI-RS in at least one CSI-RS, and the processing module may be specifically configured to receive a corresponding CSI-RS according to the configured virtual bandwidth, where the CSI-RS is an NZP CSI-RS or a ZP CSI-RS.

Further, when the CSI-RS is an NZP CSI-RS, a sequence of the NZP CSI-RS is generated based on a preset formula and according to a virtual bandwidth corresponding to the NZP CSI-RS; or a sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula; or a sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

Optionally, the processing module may be specifically configured to perform RRM measurement according to the virtual bandwidth of the CSI-RS.

Optionally, when the CSI-RS is an NZP CSI-RS, the processing module may further be configured to receive transmit power information corresponding to the NZP CSI-RS on a virtual bandwidth corresponding to the virtual bandwidth configuration information.

The apparatus in this embodiment uses the foregoing module to implement the technical solution of the bandwidth configuration method provided in the embodiments of the present invention. Implementation principles and technical effects thereof are similar, and details are not repeatedly described herein.

Further, the bandwidth configuration apparatus provided in this embodiment of the present invention is further applied to an application scenario for configuring a virtual bandwidth for a CSI-IM. In the application scenario, the receiving module may be specifically configured to receive virtual bandwidth configuration information corresponding to each CSI-IM in at least one CSI-IM.

Optionally, the bandwidth configuration apparatus provided in this embodiment of the present invention is further applied to an application scenario for configuring a virtual bandwidth for a CSI process. In the application scenario, the at least one piece of virtual bandwidth configuration information is virtual bandwidth configuration information corresponding to each CSI process in at least one channel state information process CSI process, and the processing module may further be specifically configured to perform measurement or measurement feedback of the CSI according to the virtual bandwidth configuration information corresponding to each CSI process.

If the bandwidth configuration apparatus is applied to the application scenario for configuring a virtual bandwidth for a CSI process, optionally, a starting position of the virtual bandwidth is a starting position of any one subband in subbands obtained by dividing according to a downlink maximum available bandwidth or a downlink transmission bandwidth; and/or a size of the virtual bandwidth equals a sum of sizes of at least one subband in the subbands obtained by dividing according to the downlink maximum available bandwidth or the downlink transmission bandwidth.

Optionally, a virtual bandwidth corresponding to the CSI process is covered within a range of a virtual bandwidth of an NZP CSI-RS and/or a CSI-IM corresponding to the CSI process, or the virtual bandwidth configuration information corresponding to the CSI process is virtual bandwidth configuration information of an NZP CSI-RS and/or a CSI-IM corresponding to the CSI process.

Optionally, the bandwidth configuration apparatus provided in this embodiment of the present invention is further applied to an application scenario for configuring a virtual bandwidth for resource allocation. In the application scenario, the virtual bandwidth configuration information is used for indicating a corresponding virtual bandwidth used for performing resource allocation for the UE, where there is at least one corresponding virtual bandwidth used for performing resource allocation for the UE.

If the bandwidth configuration apparatus is applied to the application scenario for configuring a virtual bandwidth for a CSI process, optionally, the corresponding virtual bandwidth used for performing resource allocation for the UE and a virtual bandwidth corresponding to the CSI process are independently configured.

Optionally, a resource included to perform resource allocation once for the UE is a resource on at least one virtual bandwidth.

Optionally, the receiving module may further be configured to receive resource allocation information, where the resource allocation information includes index information of at least one virtual bandwidth corresponding to a resource allocated to the UE. Optionally, a length of the resource allocation information is determined by a size of the virtual bandwidth.

Optionally, when the receiving module receives at least two pieces of virtual bandwidth configuration information, the receiving module may further be configured to receive scheduling information of inter-virtual bandwidth, where the scheduling information includes index information for indicating a virtual bandwidth corresponding to a resource scheduled by using the scheduling information.

Optionally, a size of a resource block group in the virtual bandwidth is determined according to the virtual bandwidth or the downlink maximum available bandwidth or the downlink transmission bandwidth.

Optionally, in all the embodiments, in a scenario, the receiving module may further be configured to receive third configuration information of rate matching and quasi co-location assumption corresponding to the virtual bandwidth.

Optionally, in all the embodiments, in still another scenario, the receiving module may further be configured to receive fourth configuration information of quasi co-location assumption corresponding to the virtual bandwidth, where the fourth configuration information includes at least one of the following information: a quantity of ports of a CRS, position information of a subframe of a CRS, position information of a first symbol of a PDSCH, MBSFN configuration information in the virtual bandwidth, and ZP CSI-RS configuration information in the virtual bandwidth.

Optionally, in all the embodiments, in still another scenario, the receiving module may further be configured to receive fifth configuration information of quasi co-location assumption corresponding to the virtual bandwidth, where the fifth configuration information includes at least one of the following information: configuration information of a CSI-RS that is quasi co-located with a DM RS and configuration information of a CRS that is quasi co-located with a CSI-RS.

Further, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

Optionally, the receiving module may further be configured to receive sixth configuration information, where the sixth configuration information is used for indicating a transmission resource of PUCCH ACK/NACK corresponding to the virtual bandwidth.

The apparatus in this embodiment uses the foregoing modules to implement the technical solution of the bandwidth configuration method provided in the embodiments of the present invention, and has corresponding functional modules. Implementation principles and technical effects thereof are similar, and details are not repeatedly described herein. Corresponding functions of the functional modules in the apparatus in this embodiment of the present invention may be implemented by software, or may be implemented by hardware, or may be implemented in a manner of a combination of hardware and software.

Embodiment 18

Figure 13:
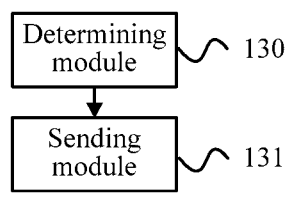
FIG. 13 is a schematic structural diagram of a bandwidth configuration apparatus provided in Embodiment 18 of the present invention.

FIG. 13 is a schematic structural diagram of a bandwidth configuration apparatus provided in Embodiment 18 of the present invention. For the apparatus in this embodiment, the apparatus is configured in a base station, and may be configured to perform the technical solution of the bandwidth configuration method, performed on a base station side, provided in the embodiments of the present invention.

As shown in FIG. 13, the apparatus in this embodiment specifically includes: a determining module 130 and a sending module 131. The determining module 130 is configured to determine at least one virtual bandwidth that is used by user equipment UE to perform signal reception and/or signal processing; and the sending module 131 is configured to send at least one piece of virtual bandwidth configuration information to the UE, so as to instruct the UE to perform signal reception and/or signal processing according to at least one virtual bandwidth in the virtual bandwidth indicated by the at least one piece of virtual bandwidth configuration information, where each virtual bandwidth is a part or all of a downlink maximum available bandwidth or a downlink transmission bandwidth, and the downlink maximum available bandwidth is a maximum bandwidth available for downlink transmission.

The apparatus in this embodiment uses the foregoing modules to implement the technical solution of the bandwidth configuration method provided in the embodiments of the present invention, and has corresponding functional modules. Implementation principles and technical effects thereof are similar, and details are not repeatedly described herein. Corresponding functions of the functional modules in the apparatus in this embodiment of the present invention may be implemented by software, or may be implemented by hardware, or may be implemented in a manner of a combination of hardware and software.

Optionally, the sending module 131 is specifically configured to send at least two pieces of virtual bandwidth configuration information to the UE, and the sending module 131 may further be configured to send first configuration information to the UE, where the first configuration information is used for instructing the UE to perform signal reception or signal processing according to a virtual bandwidth corresponding to at least one piece of virtual bandwidth configuration information in the at least two pieces of virtual bandwidth configuration information.

Optionally, the sending module 131 may further be configured to send, to the UE, second configuration information that is used for performing signal reception and/or signal processing on the virtual bandwidth, where the second configuration information is configuration information of the signal or signal processing.

Optionally, the virtual bandwidth configuration information is used for instructing the UE to perform at least one type of signal reception or signal processing on each virtual bandwidth in the virtual bandwidth corresponding to the at least one piece of virtual bandwidth configuration information.

Optionally, the signal reception and/or signal processing includes at least one of the following signal reception or signal processing: CSI-RS reception, CRS reception, PDCCH search, EPDCCH search, CSI measurement, RRM measurement, CSI feedback, PDSCH reception, PHICH reception, EPHICH reception, PMCH reception, and common signal reception, where the common signal reception includes at least one of the following: PBCH reception, ePBCH reception, PSS/SSS reception, and discovery signal reception.

Optionally, the virtual bandwidth configuration information includes at least one piece of information of a size, position information, a type, and downlink transmit power information of the virtual bandwidth.

Optionally, the position information of the virtual bandwidth includes starting position information of the virtual bandwidth or central frequency information of the virtual bandwidth, where a starting position of the virtual bandwidth is a starting position of any one resource block group in resource block groups obtained by dividing according to the downlink maximum available bandwidth or the downlink transmission bandwidth.

Optionally, the size of the virtual bandwidth equals a sum of sizes of at least one resource block group in resource block groups obtained by dividing according to the downlink maximum available bandwidth or the downlink transmission bandwidth; or the size of the virtual bandwidth is predefined.

Optionally, the downlink transmit power information includes transmit power of a CRS or a reduced cell-specific reference signal RCRS.

Optionally, the type of the virtual bandwidth is at least one of a centralized virtual bandwidth, a discontinuous virtual bandwidth, and a distributed virtual bandwidth.

Optionally, when the sending module 131 sends at least two pieces of virtual bandwidth configuration information to the UE, at least one of position information, sizes, types, and downlink transmit power information corresponding to virtual bandwidths indicated by any two pieces of virtual bandwidth configuration information in the at least two pieces of virtual bandwidth configuration information is different.

Optionally, the sending module 131 may further be specifically configured to send, to the UE, the at least one piece of virtual bandwidth configuration information carried in broadcast message signaling or multicast signaling or UE specific signaling.

Optionally, the virtual bandwidth configuration information includes information for indicating whether a common signal and/or a common channel is transmitted on the virtual bandwidth, where the common signal includes at least one of a CRS, a cell specific CSI-RS, a system information block, a primary synchronization signal, a secondary synchronization signal, and a discovery signal; and the common channel includes at least one of a physical broadcast channel and a physical common control channel.

Embodiment 19

This embodiment of the present invention is based on the foregoing embodiment, and the virtual bandwidth configuration apparatus is used separately in different application scenarios.

In a specific application scenario, the bandwidth configuration apparatus is configured to configure a virtual bandwidth for a CSI-RS. In the application scenario, the sending module may be specifically configured to send, to the UE, virtual bandwidth configuration information corresponding to each CSI-RS in at least one CSI-RS, so that the UE receives a corresponding CSI-RS according to at least one virtual bandwidth in the virtual bandwidth indicated by the at least one piece of virtual bandwidth configuration information, where the CSI-RS is an NZP CSI-RS or a ZP CSI-RS.

Optionally, when the CSI-RS is an NZP CSI-RS, a sequence of the NZP CSI-RS is generated based on a preset formula and according to a virtual bandwidth corresponding to the NZP CSI-RS; or a sequence of the NZP CSI-RS is obtained by truncating, according to a position of a virtual bandwidth corresponding to the NZP CSI-RS in a downlink transmission bandwidth, from a sequence generated according to the downlink transmission bandwidth and based on a preset formula; or a sequence of the NZP CSI-RS is obtained by truncating, according to a position of a virtual bandwidth of the NZP CSI-RS in a downlink maximum available bandwidth, from a sequence generated according to the downlink maximum available bandwidth and based on a preset formula.

Optionally, when the CSI-RS is an NZP CSI-RS, the sending module may further be configured to send, to the UE, transmit power information corresponding to the NZP CSI-RS on a virtual bandwidth corresponding to the virtual bandwidth configuration information.

In another specific application scenario, the bandwidth configuration apparatus may be configured to configure a virtual bandwidth for a CSI-IM. In the application scenario, the sending module may be specifically configured to send, to the UE, virtual bandwidth configuration information corresponding to each CSI-IM in at least one CSI-IM.

In still another specific application scenario, the bandwidth configuration apparatus may be configured to configure a virtual bandwidth for a CSI process. In the application scenario, the sending module may be specifically configured to send, to the UE, virtual bandwidth configuration information corresponding to each CSI process in at least one CSI process, so that the UE performs measurement or measurement feedback of the CSI according to the virtual bandwidth configuration information corresponding to each CSI process.

Optionally, a starting position of the virtual bandwidth is a starting position of any one subband in subbands obtained by dividing according to a downlink maximum available bandwidth or a downlink transmission bandwidth; and/or the size of the virtual bandwidth equals a sum of sizes of at least one subband in the subbands obtained by dividing according to the downlink maximum available bandwidth or the downlink transmission bandwidth.

Optionally, a virtual bandwidth corresponding to the CSI process is covered within a range of a virtual bandwidth of an NZP CSI-RS and/or a CSI-IM corresponding to the CSI process, or the virtual bandwidth configuration information corresponding to the CSI process is virtual bandwidth configuration information of an NZP CSI-RS and/or a CSI-IM corresponding to the CSI process.

In still another specific application scenario, the bandwidth configuration apparatus may be configured to configure a virtual bandwidth for resource allocation. In the application scenario, the virtual bandwidth configuration information may be configured to indicate a corresponding virtual bandwidth used for performing resource allocation for the UE, where there is at least one corresponding virtual bandwidth used for performing resource allocation for the UE.

Optionally, the corresponding virtual bandwidth used for performing resource allocation for the UE and a virtual bandwidth corresponding to the CSI process are independently configured.

Optionally, a resource included to perform resource allocation once for the UE is a resource on at least one virtual bandwidth.

Optionally, the sending module may further be configured to send resource allocation information to the UE, where the resource allocation information includes index information of at least one virtual bandwidth corresponding to the resource. Optionally, a length of the resource allocation information is determined by a size of the virtual bandwidth.

Optionally, the sending module may further be configured to send scheduling information of inter-virtual bandwidth to the UE when at least two pieces of virtual bandwidth configuration information are sent to the UE, where the scheduling information includes index information that is used for indicating a virtual bandwidth corresponding to the scheduling information and that is sent by the base station to the UE.

Optionally, a size of a resource block group in the virtual bandwidth is determined according to the virtual bandwidth or the downlink maximum available bandwidth or the downlink transmission bandwidth.

Optionally, in all the embodiments, in a scenario, the sending module may further be configured to send, to the UE, third configuration information of rate matching and quasi co-location assumption corresponding to the virtual bandwidth.

Optionally, in all the embodiments, in another scenario, the sending module may further be configured to send, to the UE, fourth configuration information of quasi co-location assumption corresponding to the virtual bandwidth, where the fourth configuration information includes at least one of the following information: a quantity of ports of a cell-specific reference signal CRS, position information of a subframe of a cell-specific reference signal CRS, position information of a first symbol of a PDSCH, MBSFN configuration information in the virtual bandwidth, and ZP CSI-RS configuration information in the virtual bandwidth.

Optionally, in all the embodiments, in still another scenario, the sending module may further be configured to send, to the UE, fifth configuration information of quasi co-location assumption corresponding to the virtual bandwidth, where the fifth configuration information includes at least one of the following information: configuration information of a CSI-RS that is quasi co-located with a DM RS and configuration information of a CRS that is quasi co-located with a CSI-RS.

Optionally, a reference signal used for the quasi co-location assumption and/or rate matching is a reference signal outside the virtual bandwidth or a reference signal whose transmission bandwidth is greater than the virtual bandwidth or a reference signal whose transmission bandwidth intersects with the virtual bandwidth.

Optionally, in all the embodiments, in yet another scenario, the sending module may further be configured to send sixth configuration information to the UE, where the sixth configuration information is used for indicating a transmission resource of a physical uplink control channel PUCCH acknowledgement signal/negative-acknowledgement signal ACK/NACK corresponding to the virtual bandwidth.

The apparatus in this embodiment uses the foregoing modules to implement the technical solution of the bandwidth configuration method provided in the embodiments of the present invention, and has corresponding functional modules. Implementation principles and technical effects thereof are similar, and details are not repeatedly described herein. Corresponding functions of the functional modules in the apparatus in this embodiment of the present invention may be implemented by software, or may be implemented by hardware, or may be implemented in a manner of a combination of hardware and software.

Embodiment 20

Figure 14:
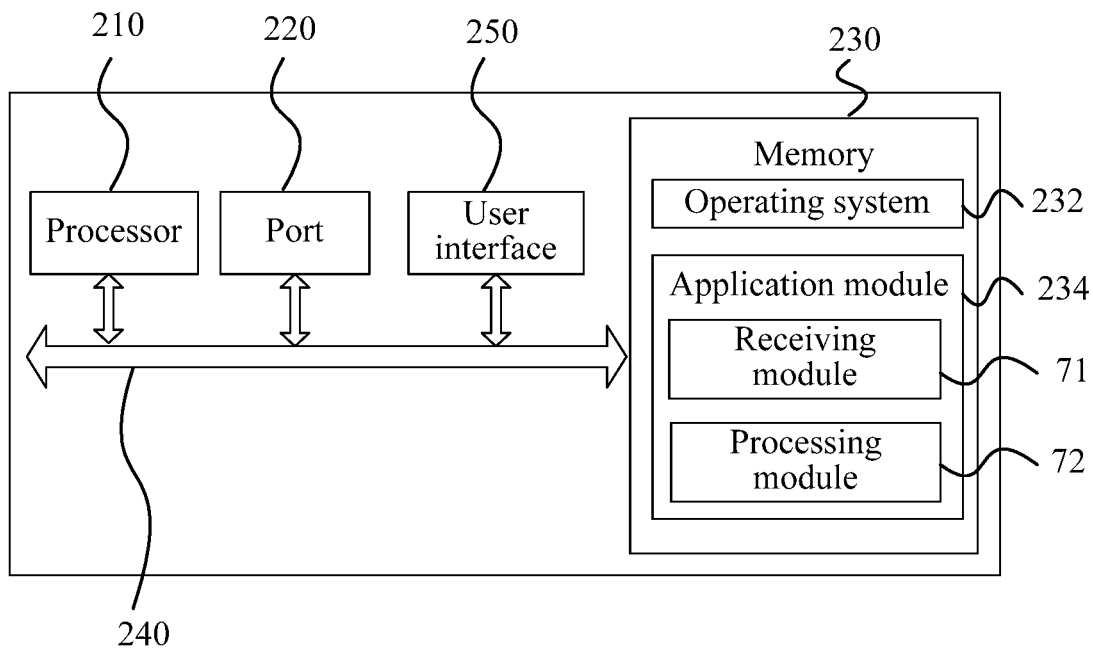
FIG. 14 is a schematic structural diagram of UE provided in Embodiment 20 of the present invention.

FIG. 14 is a schematic structural diagram of UE provided in Embodiment 20 of the present invention. As shown in FIG. 14, the UE generally includes at least one processor 210, for example, a central processing unit (CPU for short), and a digital signal processor (DSP for short), at least one port 220, a memory 230, and at least one communications bus 240. The communications bus 240 is configured to implement connection and communication among these apparatuses. The processor 210 is configured to execute an executable module, for example, a computer program, stored in the memory 230. Optionally, the UE may include a user interface 250, where the user interface 250 includes but is not limited to a display, a keyboard, and a click device, for example, a mouse, a trackball, a touch panel, or a touchscreen. The memory 230 may include a random access memory (RAM for short), or may further include a non-volatile memory, for example, at least one disk memory.

In some implementation manners, the memory 230 stores the following elements, executable modules or data structures, or subsets thereof, or extended sets thereof:

an operating system 232, including various system programs, used for implementing various basic services and processing hardware-based tasks; and an application module 234, including various application programs, used for implementing various application services.

The application module 234 includes but is not limited to a receiving module 71 and a processing module 72. For specific implementation of the modules in the application module 234, reference may be made to corresponding modules in a bandwidth configuration apparatus, and details are not repeatedly described herein.

Embodiment 21

Figure 15:
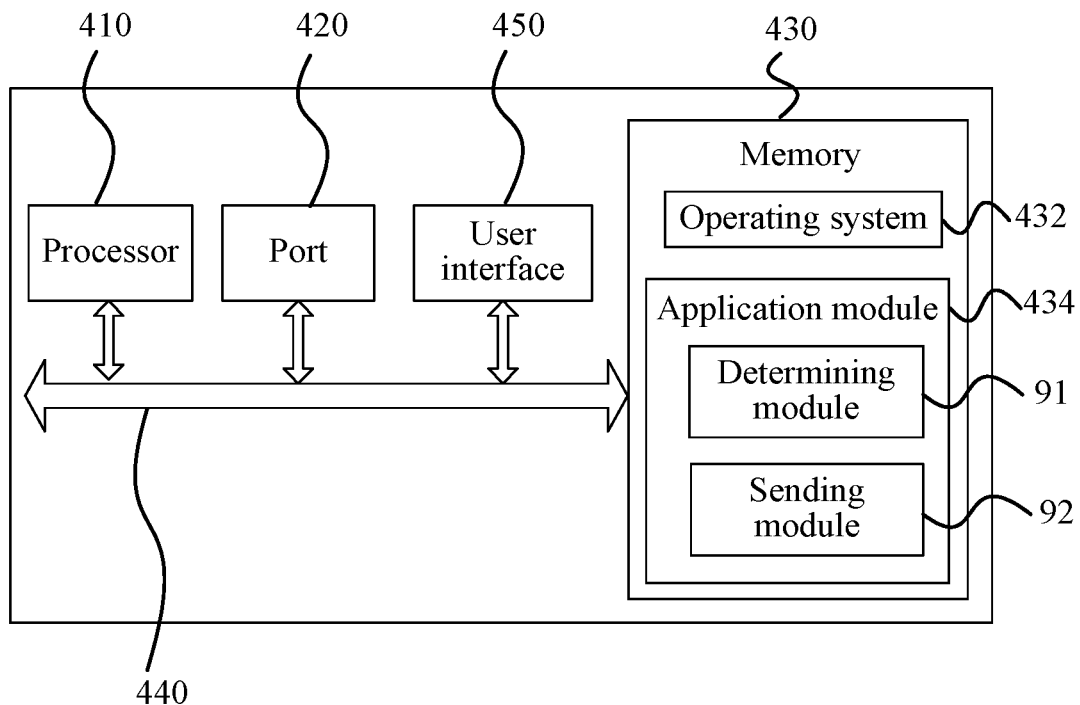
FIG. 15 is a schematic structural diagram of a base station provided in Embodiment 21 of the present invention.

FIG. 15 is a schematic structural diagram of a base station provided in Embodiment 21 of the present invention. As shown in FIG. 15, the base station generally includes at least one processor 410, for example, a CPU and a DSP, at least one port 420, a memory 430, and at least one communications bus 440. The communications bus 440 is configured to implement connection and communication among these apparatuses. The processor 410 is configured to execute an executable module, for example, a computer program, stored in the memory 430. Optionally, the base station may include a user interface 450. The user interface 450 includes but is not limited to a display, a keyboard, and a click device, for example, a mouse, a trackball, a touch panel, or a touchscreen. The memory 430 may include a RAM, or may further include a non-volatile memory, for example, at least one disk memory.

In some implementation manners, the memory 430 stores the following elements, executable modules or data structures, or subsets thereof, or extended sets thereof:

an operating system 432, including various system programs, used for implementing various basic services and processing hardware-based tasks; and an application module 434, including various application programs, used for implementing various application services.

The application module 434 includes but is not limited to a determining module 91 and a sending module 92. For specific implementation of the modules in the application module 434, reference may be made to corresponding modules in a bandwidth configuration apparatus, and details are not repeatedly described herein.

A person of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A method, comprising:
receiving virtual bandwidth configuration information comprising a first virtual bandwidth configuration information, wherein the first virtual bandwidth configuration information indicates a first virtual bandwidth in a downlink transmission bandwidth of a serving cell, wherein the first virtual bandwidth is a part or all of the downlink transmission bandwidth of the serving cell; and
performing signal reception on the first virtual bandwidth, wherein the performing signal reception on the first virtual bandwidth comprises receiving a non-zero power channel state information reference signal (NZP CSI-RS) on the first virtual bandwidth, wherein a sequence of the NZP CSI-RS is a truncation of a first sequence, and the sequence of the NZP CSI-RS corresponds to a position of the first virtual bandwidth in the downlink transmission bandwidth, and the first sequence is generated based on a preset formula.

2. The method according to claim 1, wherein the virtual bandwidth configuration information further comprises a second virtual bandwidth configuration information indicating a second virtual bandwidth of the serving cell, and the method further comprises:
receiving first configuration information, wherein the first configuration information indicates the first virtual bandwidth for performing signal reception on the first virtual bandwidth.

3. The method according to claim 1, wherein the virtual bandwidth configuration information is carried in higher layer signaling.

4. The method according to claim 1, further comprising:
receiving scheduling information in the first virtual bandwidth, wherein the scheduling information comprises index information of a second virtual bandwidth, and a resource scheduled via the scheduling information is within the second virtual bandwidth.

5. The method of claim 4, further comprising:
performing signal reception on the second virtual bandwidth.

6. The method according to claim 4, wherein a length of the scheduling information is determined by a size of the second virtual bandwidth.

7. The method according to claim 1, further comprising:
receiving resource allocation information in the first virtual bandwidth, wherein the resource allocation information indicates a resource in the first virtual bandwidth, and a length of the resource allocation information is determined by a size of the first virtual bandwidth.

8. The method according to claim 7, wherein a quantity of physical resource blocks (PRBs) corresponding to the first virtual bandwidth is used as a maximum available quantity of PRBs for resource allocation.

9. The method according to claim 2, wherein each of the first and second virtual bandwidth configuration information comprises size information and position information of the corresponding virtual bandwidth.

10. The method according to claim 1, further comprising: performing
physical downlink control channel (PDCCH) search, wherein a PDCCH is received on the first virtual bandwidth.

11. A method, comprising:
transmitting virtual bandwidth configuration information for user equipment (UE) comprising first virtual bandwidth configuration information, wherein the first virtual bandwidth configuration information indicates a first virtual bandwidth in a downlink transmission bandwidth of a serving cell, wherein the first virtual bandwidth is a part or all of the downlink transmission bandwidth of the serving cell; and
sending at least one signal on the first virtual bandwidth, wherein the sending at least one signal on the first virtual bandwidth comprises sending a non-zero power channel state information reference signal (NZP CSI-RS) on the first virtual bandwidth, wherein a sequence of the NZP CSI-RS is a truncation of a first sequence, and the sequence of the NZP CSI-RS corresponds to a position of the first virtual bandwidth in the downlink transmission bandwidth, and the first sequence is generated based on a preset formula.

12. The method according to claim 11, wherein the virtual bandwidth configuration information further comprises a second virtual bandwidth configuration information indicating a second virtual bandwidth of the serving cell, and the method further comprises:
transmitting first configuration information, wherein the first configuration information indicates the first virtual bandwidth for sending at least one signal on the first virtual bandwidth.

13. The method according to claim 11, wherein the virtual bandwidth configuration information is carried in higher layer signaling.

14. The method according to claim 11, further comprising:
transmitting scheduling information in the first virtual bandwidth, wherein the scheduling information comprises index information of a second virtual bandwidth, and a resource scheduled via the scheduling information is within the second virtual bandwidth.

15. The method of claim 14, further comprising:
sending at least one signal on the on the second virtual bandwidth.

16. The method according to claim 14, wherein a length of the scheduling information is determined by a size of the second virtual bandwidth.

17. The method according to claim 11, further comprising:
transmitting resource allocation information in the first virtual bandwidth, wherein the resource allocation information indicates a resource in the first virtual bandwidth, and a length of the resource allocation information is determined by a size of the first virtual bandwidth.

18. The method according to claim 17, wherein a quantity of physical resource blocks (PRBs) corresponding to the first virtual bandwidth is used as a maximum available quantity of PRBs for resource allocation.

19. The method according to claim 12, wherein each of the first and second virtual bandwidth configuration information comprises size information and position information of the corresponding virtual bandwidth.

20. The method according to claim 11, wherein the sending at least one signal on the on the first virtual bandwidth further comprises
physical downlink control channel (PDCCH) sending, or physical downlink shared channel (PDSCH) sending.

21. An apparatus, comprising:
at least one processor coupled with a nontransitory computer-readable storage medium storing instructions, wherein the at least one processor runs the instructions, configuring the apparatus for:
receiving virtual bandwidth configuration information comprising first virtual bandwidth configuration information, wherein the first virtual bandwidth configuration information indicates a first virtual bandwidth in a downlink transmission bandwidth of a serving cell, wherein the first virtual bandwidth is a part or all of the downlink transmission bandwidth of the serving cell; and
performing signal reception on the first virtual bandwidth, wherein the performing signal reception on the first virtual bandwidth comprises receiving a non-zero power channel state information reference signal (NZP CSI-RS) on the first virtual bandwidth, wherein a sequence of the NZP CSI-RS is a truncation of a first sequence, and the sequence of the NZP CSI-RS corresponds to a position of the first virtual bandwidth in the downlink transmission bandwidth, and the first sequence is generated based on a preset formula.

22. The apparatus according to claim 21, wherein the virtual bandwidth configuration information further comprises a second virtual bandwidth configuration information indicating a second virtual bandwidth of the serving cell, and wherein the at least one processor runs the instructions, further configuring the apparatus for:
receiving first configuration information, wherein the first configuration information indicates the first virtual bandwidth for performing signal reception on the first virtual bandwidth and/or performing signal processing of one or more signals sent on the first virtual bandwidth.

23. The apparatus according to claim 21, wherein the virtual bandwidth configuration information is carried in higher layer signaling.

24. The apparatus according to claim 21, wherein the at least one processor runs the instructions, further configuring the apparatus for:
receiving scheduling information in the first virtual bandwidth, wherein the scheduling information comprises index information of a second virtual bandwidth, and a resource scheduled via the scheduling information is within the second virtual bandwidth.

25. The apparatus according to claim 24, wherein a length of the scheduling information is determined by a size of the second virtual bandwidth.

26. The apparatus of claim 24, wherein the at least one processor runs the instructions, further configuring the apparatus for:
performing signal reception on the second virtual bandwidth.

27. The apparatus according to claim 21, wherein the at least one processor runs the instructions, further configuring the apparatus for:
receiving resource allocation information in the first virtual bandwidth, wherein the resource allocation information indicates a resource in the first virtual bandwidth, and a length of the resource allocation information is determined by a size of the first virtual bandwidth.

28. The apparatus according to claim 27, wherein a quantity of physical resource blocks (PRBs) corresponding to the first virtual bandwidth is used as a maximum available quantity of PRBs for resource allocation.

29. The apparatus according to claim 22, wherein each of the first and second virtual bandwidth configuration information comprises size information and position information of the corresponding virtual bandwidth.

30. The apparatus according to claim 21, wherein the at least one processor runs the instructions, further configuring the apparatus for
physical downlink control channel (PDCCH) search, wherein a PDCCH is received on the first virtual bandwidth.

31. An apparatus, comprising:
at least one processor coupled with a nontransitory computer-readable storage medium storing instructions, wherein the at least one processor runs the instructions, configuring the apparatus for:
transmitting virtual bandwidth configuration information for user equipment (UE) comprising first virtual bandwidth configuration information, wherein the first virtual bandwidth configuration information indicates a first virtual bandwidth in a downlink transmission bandwidth of a serving cell, wherein the first virtual bandwidth is a part or all of the downlink transmission bandwidth of the serving cell; and
sending at least one signal on the first virtual bandwidth, wherein the sending at least one signal comprises sending a non-zero power channel state information reference signal (NZP CSI-RS) on the first virtual bandwidth, wherein a sequence of the NZP CSI-RS is a truncation of a first sequence, and the sequence of the NZP CSI-RS corresponds to a position of the first virtual bandwidth in the downlink transmission bandwidth, and the first sequence is generated based on a preset formula.

32. The apparatus according to claim 31, wherein the virtual bandwidth configuration information further comprises second virtual bandwidth configuration information indicating a second virtual bandwidth of the serving cell wherein the at least one processor runs the instructions, further configuring the apparatus for:
transmitting first configuration information, wherein the first configuration information indicates the first virtual bandwidth for sending at least one signal on the first virtual bandwidth.

33. The apparatus according to claim 31, wherein the virtual bandwidth configuration information is carried in higher layer signaling.

34. The apparatus according to claim 31, wherein the at least one processor runs the instructions, further configuring the apparatus for:
transmitting scheduling information in the first virtual bandwidth, wherein the scheduling information comprises index information of a second virtual bandwidth, and a resource scheduled via the scheduling information is within the second virtual bandwidth.

35. The apparatus of claim 34, wherein the at least one processor runs the instructions, further configuring the apparatus for:
sending at least one signal on the second virtual bandwidth.

36. The apparatus according to claim 34, wherein a length of the scheduling information is determined by a size of the second virtual bandwidth.

37. The apparatus according to claim 31, wherein the at least one processor runs the instructions, further configuring the apparatus to further perform:
transmitting resource allocation information in the first virtual bandwidth, wherein the resource allocation information indicates a resource in the first virtual bandwidth, and a length of the resource allocation information is determined by a size of the first virtual bandwidth.

38. The apparatus according to claim 37, wherein a quantity of physical resource blocks (PRBs) corresponding to the first virtual bandwidth is used as a maximum available quantity of PRBs for resource allocation.

39. The apparatus according to claim 32, wherein each of the first and second virtual bandwidth configuration information comprises size information and position information of the corresponding virtual bandwidth.

40. The apparatus according to claim 31, wherein the sending at least one signal on the on the first virtual bandwidth further comprises
physical downlink control channel (PDCCH) sending, or physical downlink shared channel (PDSCH) sending.

* * * * *

UNITED STATES PATENT AND TRADEMARK OFFICE
CERTIFICATE OF CORRECTION

| | | |
|---|---|---|
| PATENT NO. | : 12,022,446 B2 | Page 1 of 1 |
| APPLICATION NO. | : 18/164466 | |
| DATED | : June 25, 2024 | |
| INVENTOR(S) | : Zhou et al. | |

It is certified that error appears in the above-identified patent and that said Letters Patent is hereby corrected as shown below:

In the Claims

Claim 2: Column 58, Line 34: reads as "bandwidth configuration information further comprises a" should read as -- bandwidth configuration information further comprises --.

Claim 12: Column 59, Line 30: reads as "bandwidth configuration information further comprises a" should read as -- bandwidth configuration information further comprises --.

Claim 21: Column 60, Line 9: reads as "at least one processor coupled with a nontransitory com-" should read as -- at least one processor coupled with a non-transitory com- --.

Claim 22: Column 60, Line 33: reads as "prises a second virtual bandwidth configuration information" should read as -- prises second virtual bandwidth configuration information --.

Claim 31: Column 61, Line 19: reads as "at least one processor coupled with a nontransitory com-" should read as -- at least one processor coupled with a non-transitory com- --.

Signed and Sealed this
Sixth Day of May, 2025

Coke Morgan Stewart
*Acting Director of the United States Patent and Trademark Office*